(12) United States Patent
Buer

(10) Patent No.: US 8,332,653 B2
(45) Date of Patent: Dec. 11, 2012

(54) SECURE PROCESSING ENVIRONMENT

(75) Inventor: Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 844 days.

(21) Appl. No.: 11/043,786

(22) Filed: Jan. 26, 2005

(65) Prior Publication Data

US 2006/0090084 A1 Apr. 27, 2006

Related U.S. Application Data

(60) Provisional application No. 60/631,306, filed on Oct. 22, 2004.

(51) Int. Cl.
*G06F 11/30* (2006.01)
*G06F 9/00* (2006.01)
*H04L 9/00* (2006.01)

(52) U.S. Cl. ............. 713/189; 713/2; 713/193; 380/277

(58) Field of Classification Search .................. 713/1–2, 713/189, 193, 164–167; 380/277–278
See application file for complete search history.

(56) References Cited

U.S. PATENT DOCUMENTS

| | | | | |
|---|---|---|---|---|
| 5,615,263 A * | 3/1997 | Takahashi | ..................... | 713/164 |
| 5,982,891 A * | 11/1999 | Ginter et al. | ..................... | 705/54 |
| 6,378,072 B1 | 4/2002 | Collins et al. | | |
| 6,931,503 B1 * | 8/2005 | Robb et al. | ..................... | 711/163 |
| 6,986,052 B1 * | 1/2006 | Mittal | ............................. | 713/190 |
| 7,013,481 B1 * | 3/2006 | Ellison et al. | ..................... | 726/4 |
| 7,380,140 B1 * | 5/2008 | Weissman et al. | ............ | 713/193 |
| 2002/0048369 A1 * | 4/2002 | Ginter et al. | ................... | 380/277 |
| 2003/0070083 A1 * | 4/2003 | Nessler | ......................... | 713/193 |
| 2003/0126349 A1 * | 7/2003 | Nalawadi et al. | ................. | 711/2 |
| 2003/0126458 A1 * | 7/2003 | Teramoto et al. | ............. | 713/194 |
| 2003/0140244 A1 * | 7/2003 | Dahan et al. | ................... | 713/200 |
| 2003/0140245 A1 * | 7/2003 | Dahan et al. | ................... | 713/200 |
| 2003/0188173 A1 * | 10/2003 | Zimmer et al. | ............... | 713/189 |
| 2004/0025036 A1 * | 2/2004 | Balard et al. | ................... | 713/189 |
| 2004/0083375 A1 * | 4/2004 | Foster et al. | ................... | 713/189 |
| 2004/0123118 A1 * | 6/2004 | Dahan et al. | ................... | 713/189 |
| 2004/0139346 A1 * | 7/2004 | Watt et al. | ...................... | 713/200 |
| 2004/0148480 A1 * | 7/2004 | Watt et al. | ...................... | 711/163 |
| 2004/0158742 A1 * | 8/2004 | Srinivasan et al. | ............ | 713/201 |
| 2004/0177266 A1 * | 9/2004 | Moyer et al. | ................... | 713/200 |
| 2004/0250063 A1 * | 12/2004 | Gulick et al. | ................. | 713/160 |
| 2004/0268135 A1 * | 12/2004 | Zimmer et al. | ............... | 713/189 |
| 2006/0200680 A1 * | 9/2006 | Ellison et al. | ................. | 713/190 |
| 2007/0234070 A1 * | 10/2007 | Horning et al. | ............... | 713/190 |

* cited by examiner

*Primary Examiner* — Darren B Schwartz

(74) *Attorney, Agent, or Firm* — Sterne, Kessler, Goldstein & Fox PLLC

(57) ABSTRACT

Secure operations and components may be integrated into a conventional processing system executing a standard operating system. A secure processing environment where trusted secure application code is executed may be provided for performing secure operations. In this environment, the applications and components may access all of the components in the system including secure components. An open processing environment is provided for performing conventional operations. Conventional application code may be executed in the open environment. In the open environment, access may only be provided to open components. That is, open applications and components may not be allowed to access the secure components in the system. In this way, a secure processing environment may be provided that allows secure and non-secure applications to be simultaneously executed while protecting sensitive data and operations.

25 Claims, 15 Drawing Sheets

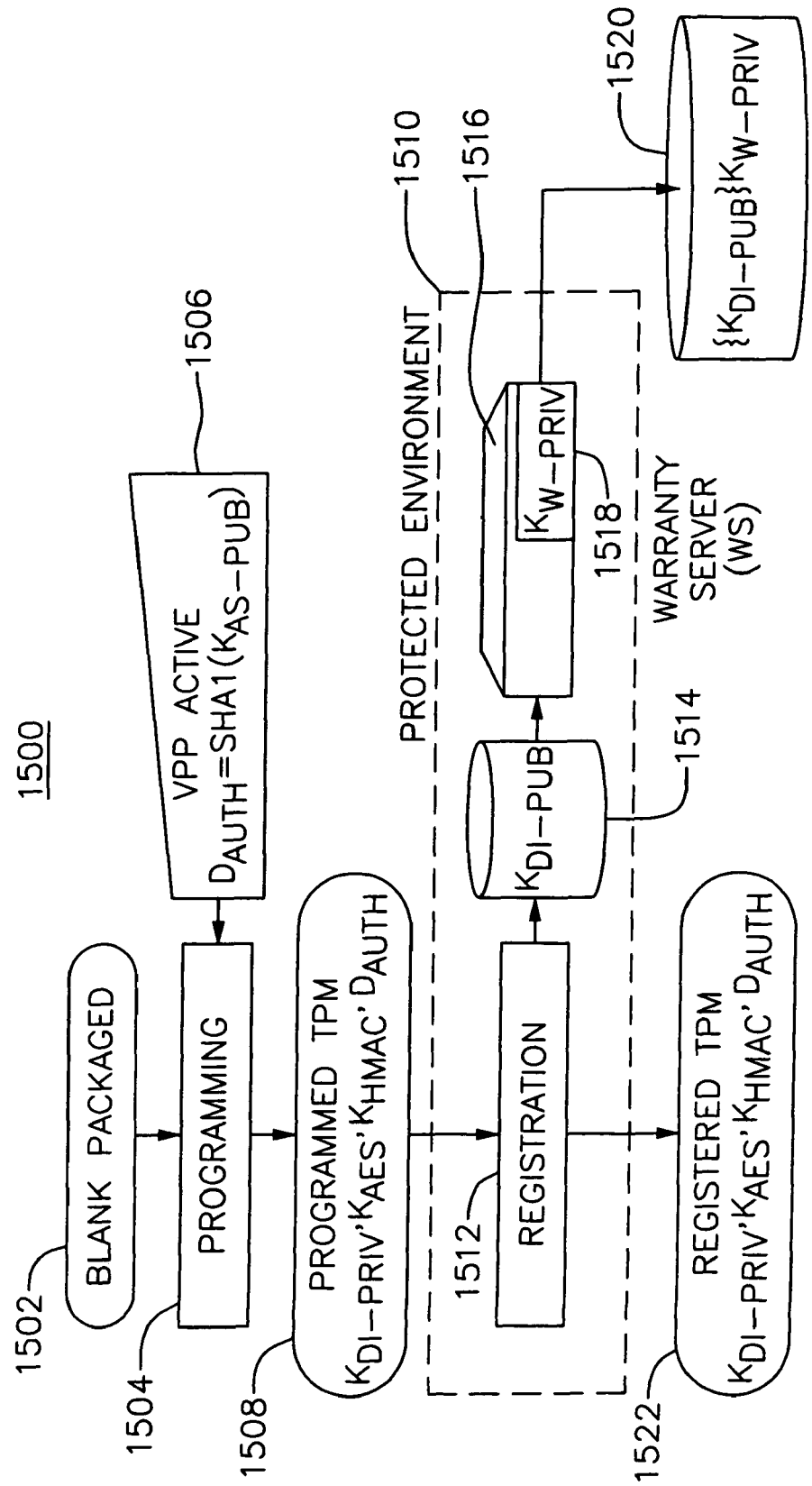

SECURE PROCESSING ENVIRONMENT

CROSS-REFERENCE TO RELATED APPLICATION

This application claims the benefit of U.S. Provisional Patent Application No. 60/621,306, filed Oct. 22, 2004, the disclosure of which is hereby incorporated by reference herein.

TECHNICAL FIELD

This application relates to data processing systems and, more specifically, to a system that provides secure and open processing modes.

BACKGROUND

In many applications a data processing system such as a computer or a phone needs to protect the information being processed from unauthorized access and/or use. For example, a data processing system may process sensitive information such as financial data or personal information that should only be accessible by authorized persons. Also, a data processing system may be used to provide conditional access to fee-based services. As an example, a data processing system may restrict access to media content such as music or software to those users who have paid the required fee.

A typical data processing system may employ cryptographic techniques to protect such information. For example, in some applications the system may encrypt sensitive data and restrict access to the cryptographic keys that decrypt the data. In addition, in some applications cryptographic techniques relating to authentication, verification and digital signatures may be used to ensure that information originates from or is sent to a specific person or a specific component in a system.

As an example of the former application, sensitive financial or personal information may need to be stored in a data storage device or transmitted over a data network. To prevent unauthorized persons from accessing the information while it is stored or transmitted, the information may be encrypted using a cryptographic key. Once encrypted, the original information may only be extracted by decrypting the encrypted information using the cryptographic key or a complementary cryptographic key. By restricting access to these cryptographic keys, access to the information may be limited to authorized persons.

As an example of the latter application, authentication, signing and/or verification techniques may be used to verify that something (e.g., information, a communicating entity, etc.) is what it purports to be. Here, cryptographic techniques may be used to verify that information originates from a particular party/device. Cryptographic techniques also may be used to verify that the information has not been altered from its original form.

To ensure that sensitive information is adequately protected, the cryptographic processes performed in the system may need to be protected as well. That is, the system needs to prevent an unauthorized person or process from gaining access to the cryptographic processes and information used by those processes. Otherwise, the information may be compromised when it is in an unencrypted form, the keys may be comprised or important cryptographic-related decision making processes may be compromised. For example, if an unauthorized person gains access to the cryptographic keys that are used to decrypt and/or encrypt information, any information encrypted using such keys may be decrypted by the unauthorized person.

Conventionally, protected cryptographic processing may be provided by incorporating secure cryptographic components into a data processing system. For example, a dedicated cryptographic processor may be used to encrypt and decrypt information for the system. Here, when the main processor in the system executes a process that needs cryptographic services (e.g., data needs to be encrypted or decrypted), the main processor will transfer the task to the cryptographic processor. The cryptographic processor then performs the requested task, provides the processed (e.g., encrypted or decrypted) data to the appropriate destination and informs the main processor that the task has been completed. In this way, the cryptographically sensitive operations and components may be physically separated from other components in the system. As a result, even if the non-cryptographic components in the system are compromised, the cryptographic components and processes may remain secure.

Measures also may be taken to ensure that keys and/or other sensitive cryptographic material cannot be accessed by unauthorized persons or processes. For example, key material may be stored in encrypted form in data memory. In this way, even if the data memory is compromised, the keys may remain secure.

In some applications the above techniques may be relatively expensive to implement. As a result, these techniques may be impractical for use in end-user devices such as phones, PDAs, etc. that need to be made as inexpensively and as small as possible. Accordingly, a need exists for more effective techniques for providing cryptographic services in a data processing system.

SUMMARY

The invention relates to a system and method for providing secure processing in a processing system. For convenience, an embodiment of a system constructed or a method practiced according to the invention will be referred to herein simply as an "embodiment."

In one aspect of the invention, cryptographic components are added to a data processing system and the system is configured to switch between one or more secure modes of operation and one or more less secure modes (referred to herein as open modes) of operation. In an open mode the system may restrict access to components and peripherals that provide or use cryptographically protected information or services. In this way, the system may provide cryptographic services while preventing non-secure components of the system from accessing components that provide cryptographic processing or data used by those components. Moreover, this may be accomplished with minimal or no impact on the normal operations of an operating system.

While in a secure mode a processor may execute code that is verified. For example, in some embodiments code executed when the system is in the secure mode may be authenticated. Thus, the system may verify that the code was installed by a trusted entity in a secure environment. In addition, the system may verify that the code was not tampered with after it was installed in the system.

Code to be executed in secure mode also may be stored in the system in an encrypted form. As a result, code may be secured even when it is stored in an external memory that is not protected from access by unauthorized persons or processes.

In some embodiments code may be authenticated and/or encrypted as it is executed. For example, when code within a given block of code is to be executed, the corresponding block of code may be retrieved from memory and authenticated and/or decrypted as necessary. In some embodiments this is accomplished via a caching technique. For example, when secure code to be executed is not found in an internal cache, the code may be retrieved from an external memory, authenticated and/or decrypted, then stored in the internal cache.

In one aspect of the invention, a peripheral may be designated as a secure peripheral or an open peripheral. Here, peripherals that contain or use cryptographically sensitive information or provide cryptographic-related services may be designated as secure peripherals. In the secure mode access may be provided to all peripherals in the system including secure peripherals. Conversely, in the open mode access may be restricted only to peripherals other than the secure peripherals.

In some embodiments memory maps are used to control access to peripherals in the system. For example, one memory map may designate peripherals that may be accessed in the secure mode. Another memory map may then designate peripherals that may be accessed in the open mode. In this case, when the system switches between modes, the memory map to be used to access peripherals may be changed as well.

In some embodiments the system includes multiple bus masters that may be defined as secure or open bus masters. For example, when a bus master is designated as an open bus master it may only have access to the restricted set of open peripherals. In contrast, secure bus masters may have access to all peripherals in the system including secure peripherals.

In some embodiments the system may operate in secure or open mode on a per bus transaction basis. That is, each transaction on the bus may be designated as either secure or open. In some embodiments one or more bus signals are used to designate the current status of the bus as secure or open. By designating the mode on a per bus transaction basis, different bus masters may, in effect, simultaneously operate in different modes.

In some embodiments secure transitions between secure and open modes are enforced by hardware. For example, a hardware component may monitor processor execution in the system. Upon detection of a call to a secure function, the hardware may change the operating mode of the system. For example, as discussed above, this may involve transferring execution to secure code and switching to a secure mode address map.

In some embodiments a system may be constructed in accordance with the invention by adding one or more security components to an existing processing system such as a system on a chip that includes an operating system. For example, a non-volatile memory may be added for securely storing key material. A secure mode controller may be added to control and enforce transitions between modes. A random number generator and an associated cryptographic processing component(s) may be added to self generate key material. A cryptographic processing component may be added for authentication, decryption and other operations. As discussed herein these components may be added to the system such that the normal operations of the operating system are, in essence, unaffected by the added security processing functions.

BRIEF DESCRIPTION OF THE DRAWINGS

These and other features, aspects and advantages of the present invention will be more fully understood when considered with respect to the following detailed description, appended claims and accompanying drawings, wherein:

FIG. 15 is a simplified diagram of one embodiment of manufacturing flow in accordance with the invention.

Figure 1:
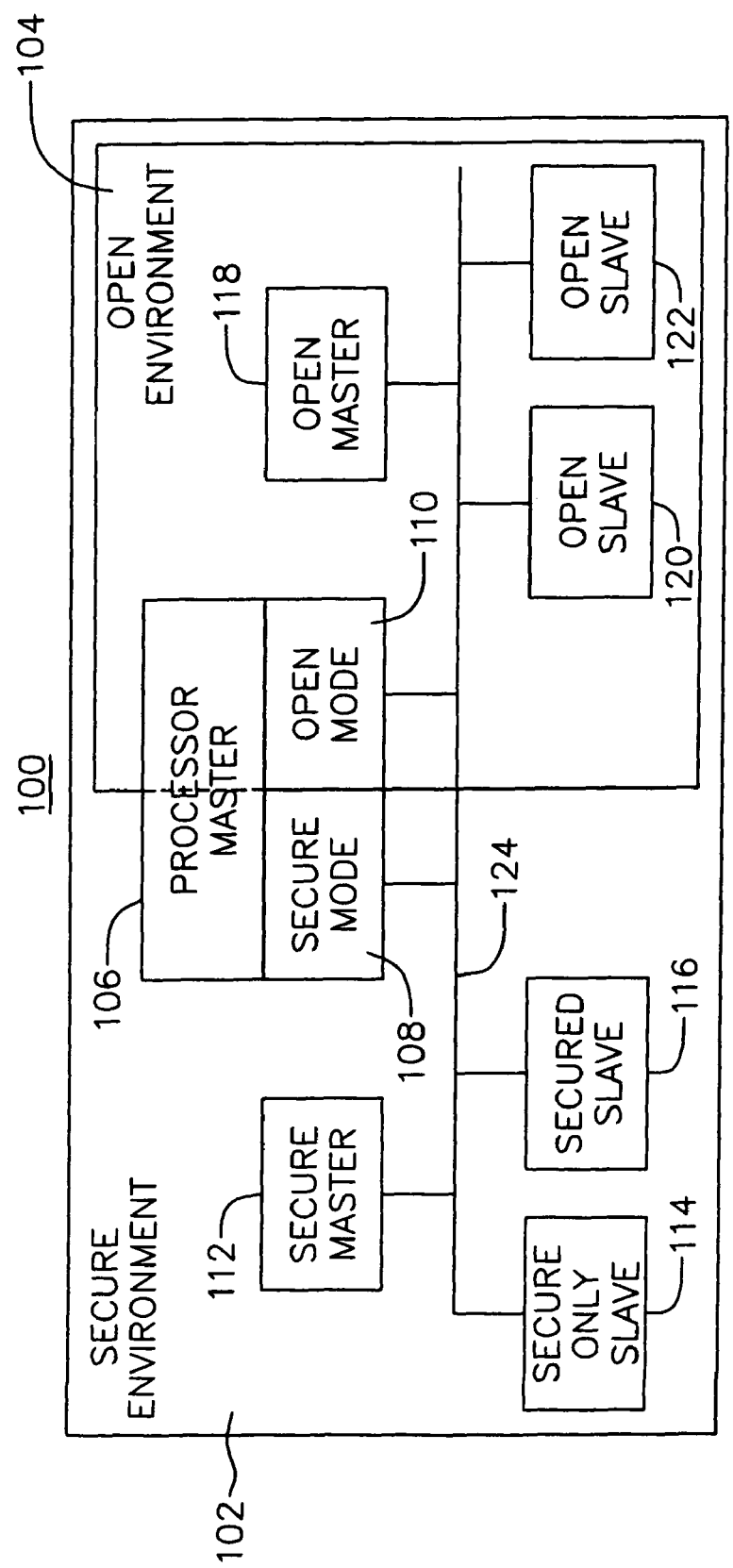
FIG. 1 is a simplified diagram of one embodiment of a processing system illustrating secure and open environments in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 illustrates in a graphic form one embodiment of a processing system 100 that supports one or more secure environments 102 and one or more open (e.g., less secure or non-secure) environments 104. Through this architectural arrangement operations performed in the secure environment and components designated as secure components may be isolated from open operations and open components in the system.

For example, it may be desirable to only allow access to operations such as cryptographic processing and components such as data memories that store key material under trusted conditions. In some embodiments this may be accomplished by performing these processes and accessing these components only when a processor is executing code that has been protected and authenticated. Components that operate under these protected conditions may be designated as secure components and allowed access to all processes and components in the system.

In contrast, components that do not operate under these protected conditions may be designated as open components. These components may then be limited to performing open operations and accessing open components. In other words, these components may be denied access to the secure processes and secure components.

The system 100 includes several bus master and bus slave components that communicate via one or more system busses 124. In some embodiments a bus master designated as a secure master may access any of the bus slaves in the system 100. For example, a secure master 112 may access either of the secure slaves 114 and 116. In addition, the secure master may access any of the open slaves 120 and 122.

In some embodiments a bus master designated as an open master may only access open bus slaves. For example, an open master 118 may access open slaves 120 and 122 but not secure slaves 114 and 116.

In some embodiments a master may be configured to operate as either a secure bus master or an open bus master. For example, a processor 106 in the system may operate as a bus master in either a secure mode 108 or an open mode 110. Thus, the processor may have access to all slaves in the system when it is operating in secure mode 108. In contrast, the processor may only have access to open slaves when it is operating in the open mode.

In this way, the execution of secure application code may be added to a general purpose processor. Here, the general purpose applications may execute on the processor (in open mode) as they normally would. These applications would not, however, have access to the secure slaves.

When secure applications need to be invoked (e.g., when an application needs data to be encrypted), the processor may switch to the secure mode. While operating in the secure mode the processor may access the secure slaves (e.g., cryptographic processors, memory that stores keys, etc.). In this way, this architecture provides an effective mechanism for "simultaneously" performing general purpose operations and secure operations on a standard operating system without impacting the security of the secure operations or impacting the normal operations of the general purpose operations.

In some embodiments, a slave may be configured to operate as either a secure slave or an open slave. For example, in the secure environment a secure master may configure a secure slave to be accessible in the open environment. In FIG. 1 this type of slave is designated as a secured slave 116. Alternatively, some slaves may be configured so that they are only secure slaves. In FIG. 1 this type of slave is designated as a secure only slave 114.

In some embodiments the secure and open environments depicted in FIG. 1 may represent several secure and open environments. That is, a system may support more than one secure environment and/or more than one open environment. For example, a first set of secure peripherals (e.g., secured slave 116) may be accessible in a first secure environment and second set of secure peripherals (e.g., secure only slave 114 and secure slave 116) may be accessible in a second secure environment. Similarly, a first set of open peripherals (e.g., open slave 120) may be accessible in a first open environment and second set of open peripherals (e.g., open slaves 120 and 122) may be accessible in a second open environment.

Different secure and open masters in the system may then be associated with different secure and open environments. For example, one secure master (e.g., secure master 112) may be configured to access the first set of secure peripherals and the open peripherals. Another secure master (e.g., processor secure mode master 108) may be configured to access all secure and open peripherals. In addition, one open master (e.g., open master 118) may be configured to access the first set of open peripherals and another open master (e.g., processor open mode master 110) may be configured to access all open peripherals. In practice, it should be appreciated that a variety of combinations of secure and open masters, slaves and environments may be defined in a system constructed in accordance with the teachings herein.

Figure 2:
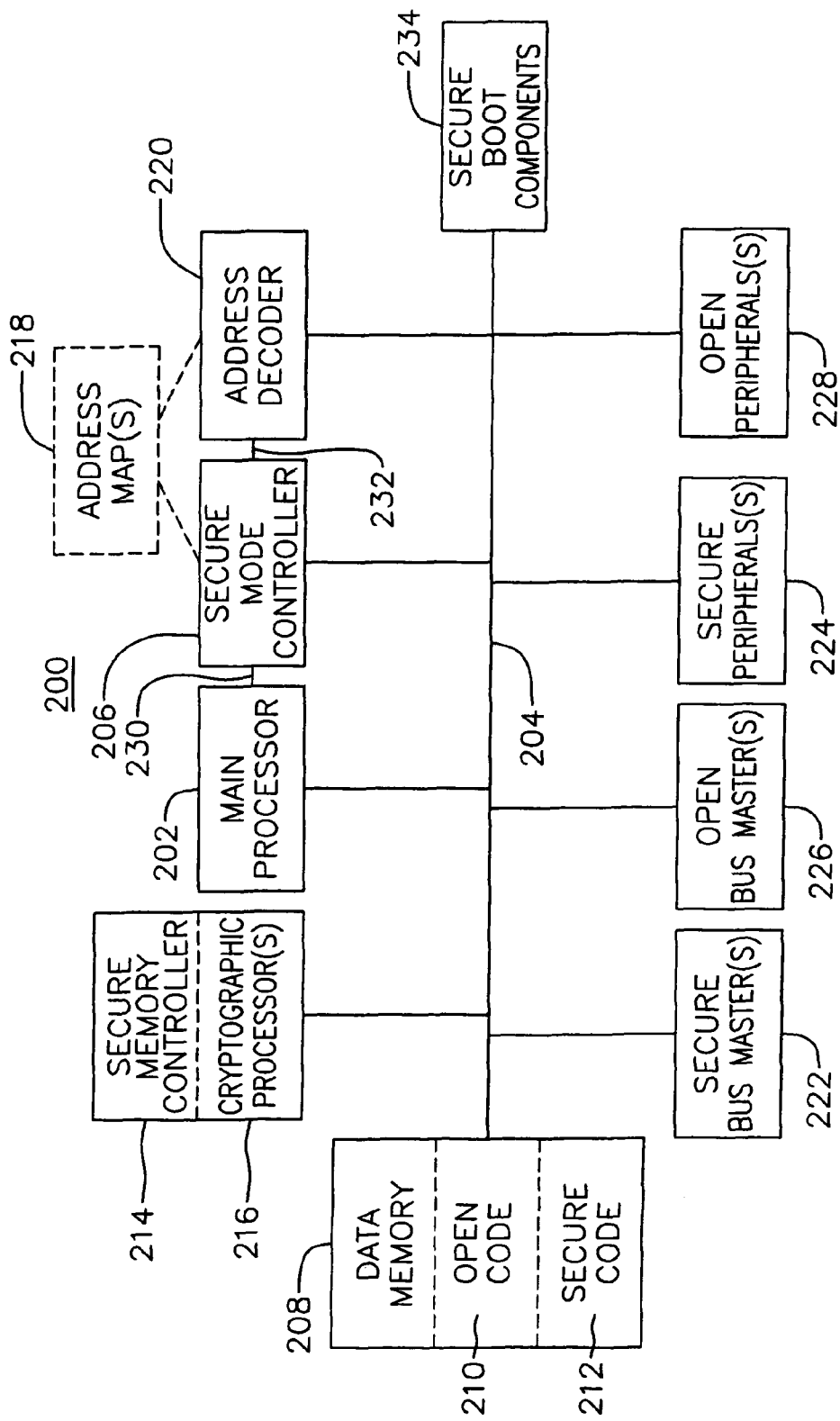
FIG. 2 is a simplified block diagram of one embodiment of a processing system constructed in accordance with the invention.

FIG. 2 illustrates one embodiment of a system 200 that may provide secure and open processing environments in accordance with the invention. A main processor 202 and several secure environment components and open environment components communicate with one other via one or more data busses 204. A secure mode controller 206 and associated components enforce (e.g., via hardware) secure transitions between the open and secure environments and enforce restrictions on access to the secure components.

One or more data memories 208 may store instruction code and data used by the processor 202 and other components. As discussed above, the processor may operate in either a secure mode or an open mode. In the open mode the processor may execute open code 210. This code may include, for example, standard application code for the system 200.

In the secure mode the processor may execute secure code 212. This code may include, for example, code that is used when the processor or another secure component initiates or performs cryptographic operations. In some embodiments the secure code 212 and associated data may be encrypted and/or authenticated before being stored in a data memory 208.

In some embodiments a secure memory controller 214 may decrypt and/or authenticate the secure code 212 and associated data as it is needed by the processor or secure components. To this end, the secure memory controller may include one or more cryptographic processors 216 that perform cryptographic encryption, decryption and authentication operations. For example, when the processor commences execution in the secure mode, the secure memory controller may fetch the code to be executed from the data memory 208, decrypt and/or authenticate the code and store the code in a local data memory such as a cache. The processor may then execute the code from the cache.

In some embodiments the secure mode controller 206 may enforce the restrictions on access to secure components in accordance with one or more address maps 218. For example, the secure mode controller may use the address map to generate secure mode master signals 232 that control an address decoder 220. The address decoder, in turn, may generate component select signals that enable the components in the system 200 to access the other components.

Through the use of these component select signals, access to the secure components may be restricted in the open environment. Here, the address map may designate the components and data memory locations in the system as either secure or open. For example, the bus masters in the system may be designated as secure bus masters 222 or open bus masters 226. In addition, the peripherals in the system may be designated as secure peripherals 224 or open peripherals 228. Also, the address map may designate certain ranges of data memory locations as open (e.g., open code 210) or secure (e.g., secure code 212).

The secure mode controller may then selectively enable or disable the generation of the component select signals by the address decoder based on the master requesting access and the peripheral being accessed. For example, a component select signal for a secure peripheral 224 may only be generated when a secure master 222 requests access to a secure peripheral.

Figure 3:
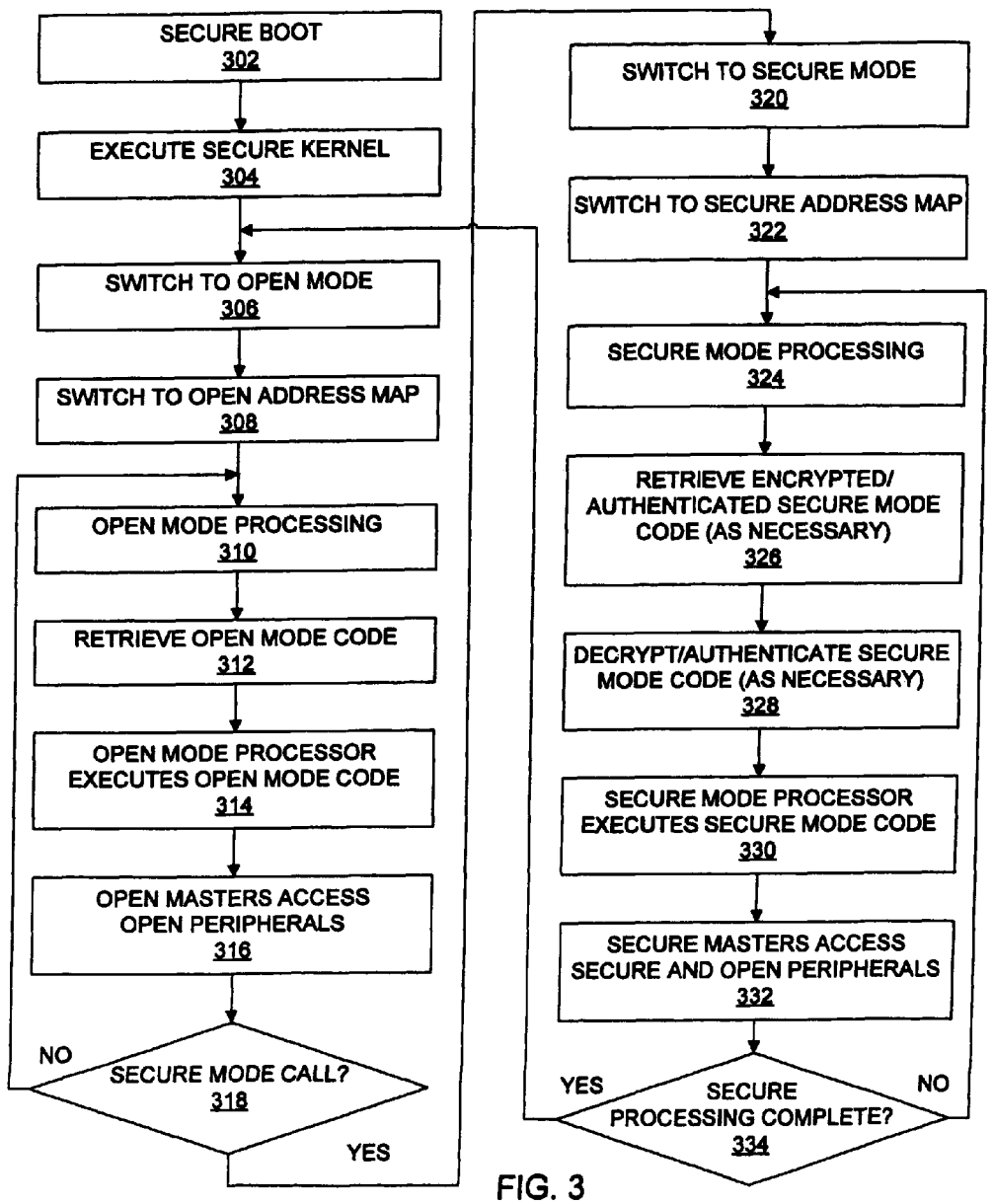
FIG. 3 is a flow chart of one embodiment of processing operations that may be performed in accordance with the invention.

These and other operations that may be performed by the system of FIG. 2 will be discussed in more detail in conjunction with the flowchart of FIG. 3. Initially, as represented by block 302, when the system is reset or powered-up the system may operate in a secure mode. For example, the system may incorporate secure boot components 234 (FIG. 2) that ensure that the processor executes a secure boot sequence. The secure boot sequence may be used to ensure that the code executed by the system has not been altered or compromised. As represented by block 304, the secure boot may transfer execution to a secure kernel that may, for example, execute in secure mode to provide services for an open operating system.

As represented by block 306, processing is switched to an open mode so that the operating system may initiate the standard operations of the system. The secure mode controller 206 ensures that the transition from secure mode to open mode is performed properly. This may involve, for example, ensuring that data stored in buffers during secure mode processing is cleared from the buffers so that the data may not be accessed during open mode. In some embodiments the secure mode controller ensures that authorized operations are performed in each mode by monitoring the program code execution of the processor. This monitoring may be accomplished, for example, via a connection 230 such as a co-processor bus. In conjunction with the switch to open mode, an open mode address map is used for accessing peripherals in the system (block 308).

As represented by block 310-314, in open mode applications are executed in the same manner as they would in a system without the secure components. Thus, the processor may retrieve and execute program code using conventional techniques. In addition, any open masters in the system may access any of the open peripherals (block 316).

As represented by block 318 standard program execution continues in open mode until a secure service needs to be invoked. For example, an open mode application may have received encrypted code that needs to be decrypted so that the application may process the data. In this case, the services of a cryptographic processor (a secure component) may be invoked via, for example, an appropriate operating system call that includes a pointer to the data that is to be decrypted.

As represented by block 320, processing is switched to a secure mode so that the operating system may initiate the secure operations. Again, the secure mode controller 206 ensures that the transition from open mode to secure mode is performed properly and that authorized operations are performed in each mode. In conjunction with the switch to secure mode, a secure mode address map is used for accessing peripherals in the system (block 322).

As represented by block 324-330, in secure mode operations may be performed using secure application code. Thus, the processor may retrieve code that is encrypted and/or authenticated (block 326). After the code is decrypted and/or authenticated (block 328) the processor executes the code (block 330) to perform the desired operation (e.g., decryption of the data from the open mode application). As represented by block 332, during this process one or more secure masters (e.g., a cryptographic processor) may access any of the peripherals in the system (e.g., a data memory that is used to store the data before and after it has been decrypted).

As represented by block 334, after the secure operations are complete (e.g., after the data is decrypted and stored in a data memory) program execution returns to open mode. The system may then switch between open and secure mode as necessary to perform the required operations.

Figure 4:
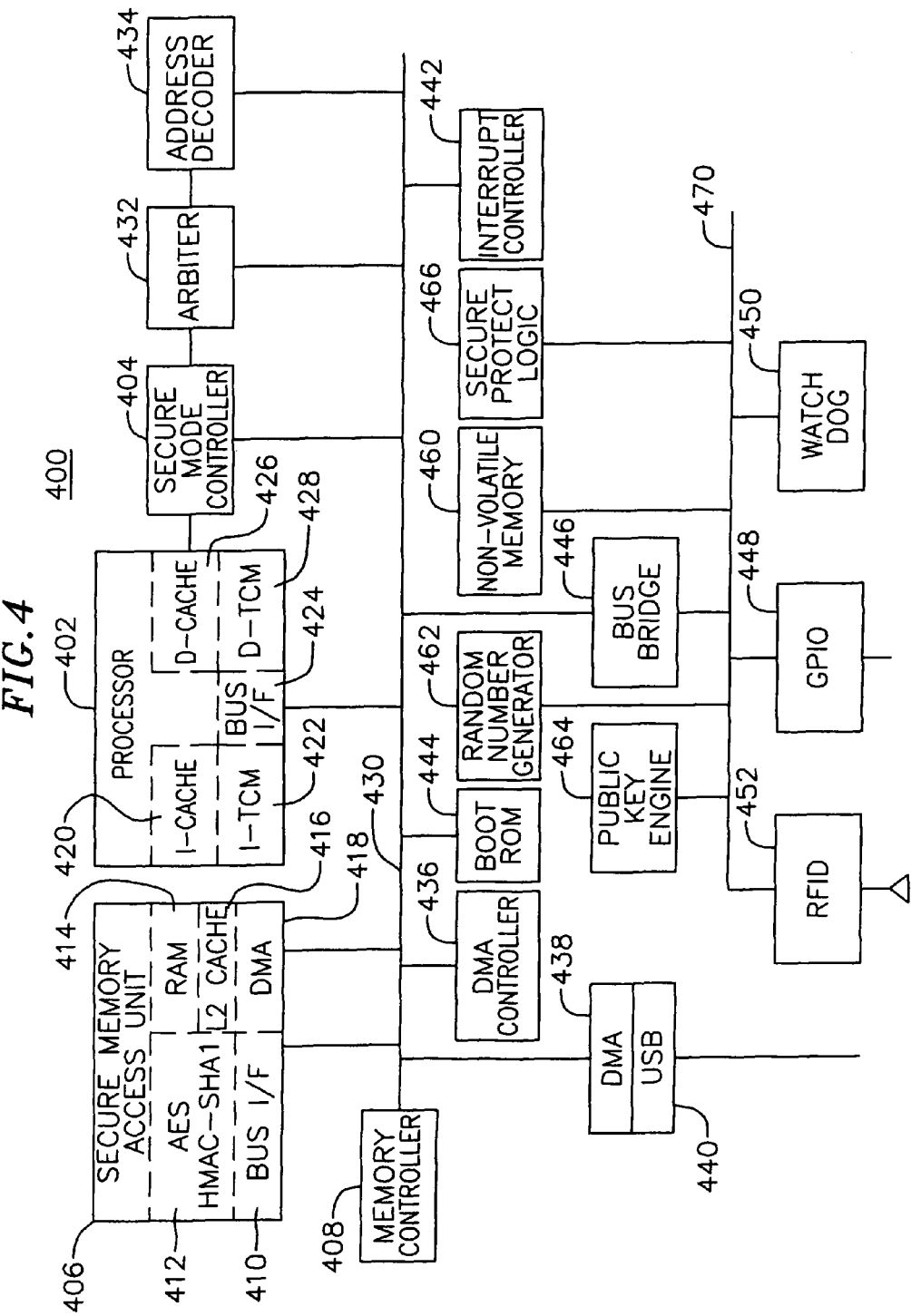
FIG. 4 is a simplified block diagram of one embodiment of a processing system constructed in accordance with the invention.

Referring now to FIG. 4, one embodiment of an embedded processing system such as a system on a chip ("SOC") 400 that has been modified to support secure application processing in accordance with the invention will be discussed in detail. In this example, the system on a chip may include conventional components such as a processor 402, a memory controller 408, an internal boot ROM 444, a bus arbiter 432, an address decoder 434, an interrupt controller, a direct memory access ("DMA") controller 436 and a universal serial bus ("USB") interface 440. Each of these components may communicate with one another via one or more system busses 430. In addition, the system may include a variety of peripheral components such as an RFID reader 452, general purpose input-output ports ("GPIO) and a watch dog timer 450 that connect to a bus 470. The components connected to the bus 430 may communicate with the components connected to the bus 470 via a bus bridge 446.

In accordance with one aspect of the invention, the system on a chip may be adapted to provide secure services by adding several secure components and associated secure service routines to the system. The secure components may include, for example, a secure mode controller ("SMC") 404, a secure memory access unit ("SMAU") 406, and several peripherals that may be used to secure the operation of the system. These peripherals may include, for example, a non-volatile memory 460, a random number generator 462, a public key engine 464 and secure protect logic 466.

Through the use of these secure components and routines, the system may provide a secure environment that protects important peripherals and the execution of critical application code (e.g., peripherals and code that process sensitive data). Moreover, the operating system in the system may essentially execute the secure environment code simultaneously with open (or non-trusted) general purpose processing code. Thus, this combination provides a highly integrated system on a chip that may use the resources of the SOC to execute secure applications and protect sensitive data without affecting the operations of the SOC's standard non-secure applications.

In one aspect, the secure mode of the system provides an environment where only trusted code is allowed to execute. In this case, the secure memory access unit 406 may automatically decrypt and/or authenticate any executable code prior to execution within the secure environment.

In another aspect, the system enforces (e.g., in hardware) a security boundary between secure and open peripherals in the system. For example, the secure mode controller 404, the arbiter 432 and the address decoder 434 may be used to prevent a master operating in the open environment of the system from accessing any peripherals or data from the secure environment. In contrast, these components may enable a master operating in the secure environment to access all of the peripherals and data in the system.

For example, in some embodiments each bus master and each peripheral in the system may be designated as either secure or open. When the bus arbiter grants the bus to a bus master, the bus arbiter may generate a secure mode master signal that indicates that a secure or open master is currently accessing the bus. The address decoder may then enable the master access to peripherals based on the state of the secure mode master signal. For example, access to secure peripherals may only be granted when the secure access signal indicates that a secure master has control of the system bus.

The processor 402 may operate as a bus master in both the secure and open environments. Thus, the processor 402 may be designated as secure or open at any given time. The secure mode controller 404 enforces the transition of the processor 402 between the secure and open mode in a manner that ensures at that information from the secure environment is not accessible by components operating in the open environment. For example, the secure mode controller may provide a signal to the bus arbiter 432 that indicates whether the processor 402 is currently operating in a secure mode or an open mode. In addition, the secure mode controller may ensure that the processor only executes secure code when in secure mode. Also, the secure mode controller may save and clear various registers, etc. to ensure that instructions and data from one mode are not accessible to the other mode.

Figure 5:
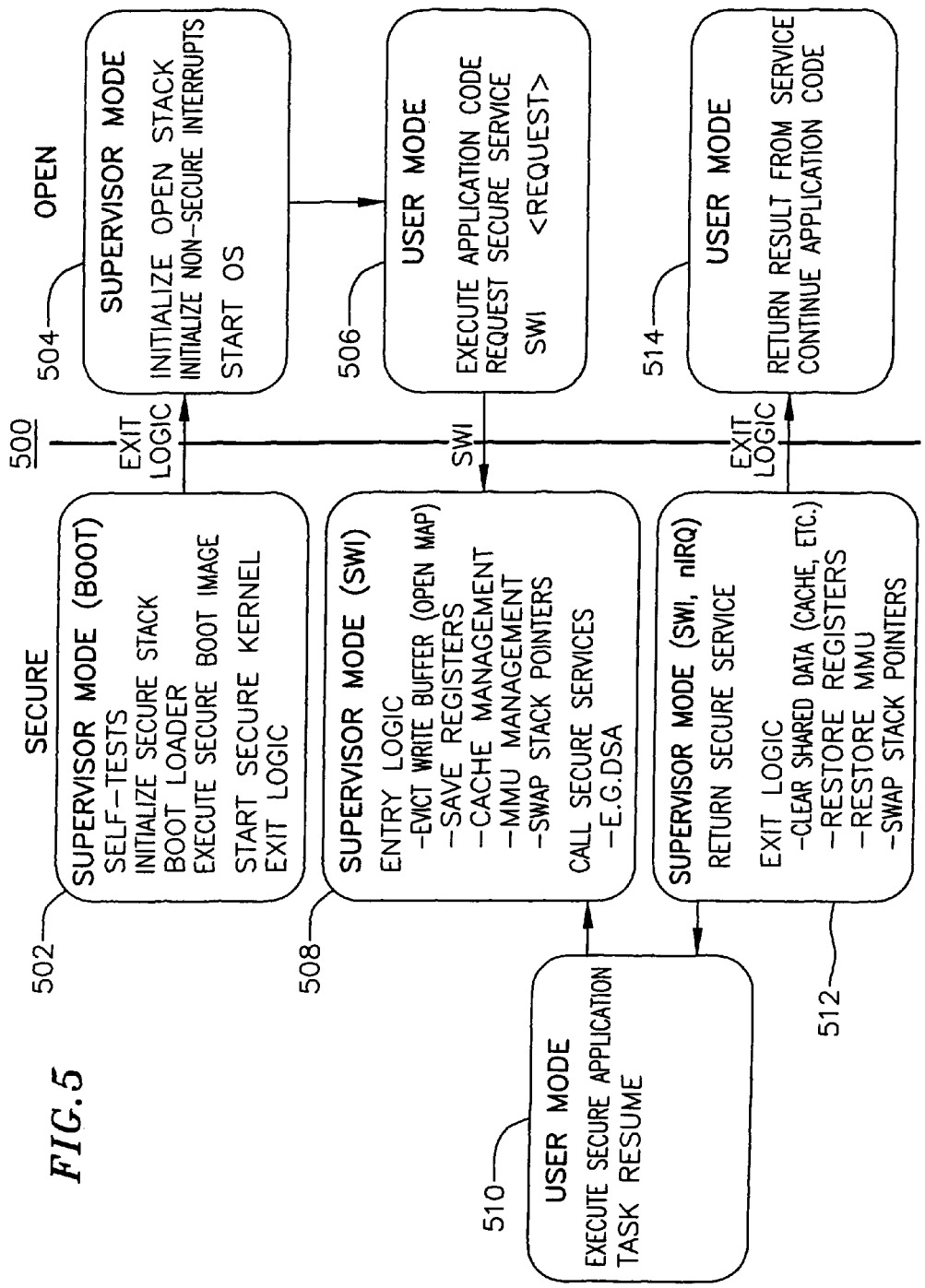
FIG. 5 is a flow chart of one embodiment of processing and mode switching operations that may be performed in accordance with the invention.

A simplified example of transitions between modes and operation in these modes is illustrated in FIG. 5. As represented by block 502, the processor initially resets to a secure supervisor mode. Here, system initialization routines perform any self-tests for the components used by a boot loader and initialize various components (e.g., the secure stack) of the system. The boot loader verifies a secure boot image using, for example, HMAC-SHA1. Provided the secure boot image verification passes, the secure boot image is executed by the boot loader. The secure boot image starts the secure kernel after configuring the secure memory access unit for automatic code decryption and authentication as well as setting up the entire security configuration for secure and open modes of operation.

An exit logic routine is then called to pass control to the open mode of operation. The exit logic routine ensures that clean-up operations are performed for critical data. For example, the secure mode controller 404 may monitor the clean-up operations before allowing a successful exit. Here, the secure mode controller may perform operations including cache flushing when required, register clearing, write buffer eviction, etc.

As represented by block 504, when execution is first passed to the open mode the system initializes the open mode stack and initializes non-secure interrupts. Next, the operating system is started and the system commences normal operation.

As represented by block 506, an application operating in open mode may need to initiate a secure service. For example, an open mode application may need to encrypt a block of data using a key that is protected by the secure environment. In this case, the open mode application may make a request to a secure mode kernel for processing the data block. A special (hardware monitored) software interrupt ("SWI") command may be used to initiate the switch from open mode to secure mode. Here, the hardware controls the transition between the open mode and secure mode to ensure that the processor transitions to execution of secure code. For example, the secure mode controller 404 may monitor the transition to ensure that the SWI is actually executed in secure supervisor mode by the processor 402. In some embodiments the instruction must be a non-cacheable bus fetch.

In addition, the hardware may ensure that the open code cannot gain control of or access any information that is available to the secure environment. As represented by block 508, entry logic performs various operations to ensure that information is saved for the return to the open mode, data from the open mode is cleared from various buffers and the secure mode is properly setup. Next, the requested secure services are called.

As represented by block 510, the secure mode kernel processes the request from open mode by, for example, accessing the requested key, loading the key into an external cryptographic accelerator and initiating a DMA request for processing the data. In this mode, the bus masters are designated as secure masters. As a result, they are allowed access to secure peripherals (e.g., data memories that contain key material and encryption algorithms).

Once the secure mode request has been handled, control is returned to open mode processing in a manner where the hardware ensures that no clear text key material (or any secure mode information) is exposed between transitions. For example, execution may be transferred back to the supervisor mode (block 512) that performs an exit logic routine. The exit logic routine may clear the buffers as necessary and restore data for the open mode, etc. The secure mode controller then enforces the supervisor to user transition (block 514).

With the above overview in mind, selected configurations and operations of the components of the system 400 will now be discussed in more detail. In particular, configurations and operations relating to modifications that support open and secure operational modes will be discussed.

As illustrated in FIG. 4 a processor sub-system 402 may include an instruction cache (I-Cache 420), data cache (D-Cache 426), tightly coupled instruction memory (I-TCM 422), tightly coupled data memory (D-TCM 428) and a memory management unit (not shown). To support secure and open modes of operation the system may control the allocation of these components for these modes. For example, the processing requirements of cache flushes, entry logic, exit logic and mode transitions as discussed herein may impact the performance of the executing operating systems. Consequently, the system may provide a flexible mechanism to efficiently allocate resources to each mode of operation.

In some embodiments security requirements of the allocations (i.e. cache flushing between modes, access permissions, etc.) may be enforced in hardware by the secure mode controller 404. For example, the secure mode controller may control the access and allocation of the I-Cache, D-Cache, I-TCM, D-TCM, memory management unit and instruction pre-fetch (always disabled for open mode in some embodiments). The secure mode controller may enforce the resource allocation and permissions, in hardware, by monitoring the co-processor interface of the processor, the bus master transfers and the device interrupts.

In some embodiments the secure mode of the processor may either allocate the I-Cache and D-Cache (non-independent) to one of the following configurations: 1) Secure Only; I-Cache and D-Cache are both disabled when operating in open mode; 2) Open Only: I-Cache and D-Cache are both disabled when operating in secure mode; 3) Both: I-Cache and D-Cache are enabled in both modes, the SMC enforces that the caches are cleared before exiting to open mode.

Similar to the allocation of I-Cache and D-Cache blocks, the system may allow regions of the TCMs to be available for open or secure mode processing. The SMC may ensure that the access permissions are enforced based on the operation mode of the processor (secure or open). However, in this scenario, the locations may be allocated and re-claimed manually by the secure code. Here, the secure code may erase critical data before allocating a region to open mode. Additionally, the secure mode code should ensure that it does not execute any residual data in a region when it is reclaimed by secure mode. For example, the system may erase the entire region before changing allocations.

The MMU unit may be allocated to open mode processing or completely controlled by secure mode. When allocated to open mode, the MMU is completely disabled for secure mode processing. Therefore, if using an operating system in secure mode and open mode which both require MMU support, the secure mode code provides a service to change the MMU settings for the open mode operating system and incorporate the appropriate checks.

The system may support DMA access to both the I-TCM and the D-TCM. The DMA access is interfaced to the processor subsystem as a memory mapped address. For encryption or decryption of data using the SMAU hardware acceleration slave interface, both channels of the DMA controller 436 may be used to complete the transaction.

For example, in the case of data encryption, a DMA channel (1) may be used to transfer data from the TCM to the slave DMA interface 418 of the SMAU. DMA channel (0) may be used to transfer the encrypted and authenticated data from the SMAU to memory.

In the case of data decryption, a DMA channel (1) may be used to transfer data from memory to the slave DMA interface of the SMAU. DMA channel (0) may be used to transfer the decrypted and authenticated data from the SMAU to the target TCM.

As discussed above a bus master is assigned a mode of either secure or open. In addition, the processor sub-subsystem can transition between secure and open modes.

Hardware enforcement over these modes starts with control over the memory map(s) of the device. A memory map, and therefore access to locations in memory, is presented to a bus master differently depending on the access permissions of that master. In some embodiments the system supports two sets of access permissions (memory maps): a secure mode where the complete address map is available, that is, access to all peripherals is allowed; and an open mode where a restricted address map is available, such that access is provided to a limited number of peripherals. For convenience the following discussion will be limited to these two modes. It should be appreciated, however, that a system may support more than two modes as discussed above.

The system allows for individual DMA channels to be allocated permissions of either secure or open. Here, the DMA controller 436 may operate in either mode simultaneously. For example, the DMA controller may have two channels each of which may be assigned individually to the open mode code by the secure mode code.

Appropriate interrupt masking in the interrupt controller 442 may be required for secure and open mode transitions. For example, the open mode code may call back to secure mode for interrupt sources that it does not own. The secure mode code may force a call back through the watchdog timer in the secure protect logic. The interrupt controller configuration may be limited to secure mode only configuration. However, a secure mode only configuration capability may require a call back to secure mode to clear interrupts.

As discussed above a combination of peripherals are added to the system on a chip to provide and enforce the secure and open processing modes. The SMC 404 is hardware block that is used to determine and enforce the transition from secure to open mode for the processor sub-subsystem. The SMC may monitor, for example, the processor pipeline, sub-system configuration, processor mode (Supervisor, User), undefined instruction fetch and software interrupt fetch. The SMC controls critical hardware parameters during the actual transition between secure and open mode for the processor based on the state of the monitored interfaces and the configuration set in the SMC.

The SMC may incorporate a processor vector table for both secure and open modes. The vector table is automatically switched by the SMC when the processor transitions modes. The SMC ensures that interrupts are blocked during the transition by monitoring the processor pipeline and directly blocking, for example, interrupt request lines to the processor prior to pipeline execution of the software interrupt vector.

The SMC ensures that the SWI vector is executed from the proper SWI vector table. Therefore, in some embodiments the open mode vector table cannot be located in cacheable space.

The SMC interacts with the entry logic and the exit logic software to provide a smooth transition between processing modes. The SMC enforces write buffer flushes and provides the mechanism for the secure mode processor to flush the write buffer to the open mode address space. The requirement for a write buffer flush to occur is enforced based on the allocation of the write buffer access to open mode.

Similarly, cache flushing requirements are enforced based on the allocation of the caches to open mode. The SMC enforces these requirements by monitoring the internal processor sub-system signals and executing in lock step with the processor entry and exit logic firmware. Only the successful completion of the entry and exit logic requirements will transition the processor between modes. The SMC keeps the processor sub-system in a quarantine mode for open to secure mode transitions where the only secure peripheral accessible to the processor is the internal ROM.

In some embodiments an unsuccessful complete transition triggers a hardware reset of the system. For example, the SMC may monitor all undefined instruction fetches performed by the processor. Here, the SMC may be configured to generate a hardware reset on all undefined instruction fetches in secure mode.

The SMC may include a secure master register ("SMR", not shown) that assigns access privileges for secure and open masters. The SMR may be located in the SMC because the other secure or open masters may be allocated statically.

In some embodiments the SMC requires that the instruction pre-fetch capability is disabled before any transition to open mode. In this way, the system may prevent pre-fetched secure mode instructions and associated data from being accessed in the open mode.

The bus arbiter 432 may use a simple priority encoded arbitration scheme for enabling bus masters access to the system bus 430. The processor is the default master of the system. In some embodiments the following priority is assigned to the bus masters from highest to lowest: processor sub-subsystem, SMAU, DMA controller, and USB.

The arbiter generates one or more secure mode master signals for the bus 430 based on the master it grants to the bus 430 for each transaction. In some embodiments the bus master modes are determined as follows: the processor mode (secure or open) is set by the SMC; the SMAU is fixed to secure mode, the DMA controller mode (secure or open per channel) is set by the secure master register, the USB mode (secure or open all channels the same) is set by the secure master register.

The address decoder 434 supports a reduced memory map for open mode masters. The address decoder may include a secure peripheral register ("SPR", not shown) that assigns peripheral access for secure, secured and open peripherals. The SPR may be used, for example, to block (e.g., using logic gates) select signals that would otherwise be provided to secure peripherals from the open mode masters.

The address decoder may contain two sets of registers for programmable address changes. The address decoder automatically applies the correct registers (secure or open) based on the access permissions of the granted master. The open master registers are configured by open masters, while the secure registers are configured by secure masters. In some embodiments, however, some of the secure peripherals (e.g., the security peripherals 460-466 discussed herein) may not be reconfigured to open mode (secure only peripherals).

The secure mode master signal generated by the bus arbiter defines the access permissions for the current master. Using this signal, the address decoder applies the SPR to the block selects of peripherals for open masters. The secure masters are allowed to access the entire memory map.

From the above it should be appreciated that each transaction on the bus may be designated as either secure or open. By designating the mode on a per bus transaction basis, different bus masters may "simultaneously" operate in different modes.

The SMAU 406 provides automatic encryption and authentication of executable (read-only) code for the processor subsystem. The SMAU intercepts instruction and data fetches made by a secure master on the bus 430. The intercepted request is retrieved from the identified memory location, decrypted and authenticated by the SMAU prior to being forwarded to the requesting master.

In the embodiment of FIG. 4, the processor 402, the SMAU 406, the DMA controller 436, the USB component 440 may be bus masters. These components may be secure masters depending on the system configuration. The bus masters may access the following slaves for the instruction portion of the system bus 430: memory controller 408, boot ROM 444, SMC 404 and SMAU 406. The bus masters may access the following slaves for the data portion of the system bus 430: memory controller 408, SMC 404, SMAU 406, USB 440, DMA controller 436, address decoder 434, bus arbiter 432 and interrupt controller 442.

In some embodiments the memory map may be configured as follows. The DMA controller 436, the boot ROM 444 and the security peripherals 460, 462, 464 and 466 are designated as secure only slaves. The memory controller 408 and the open vector table located in the SMC 404 are always open slaves. The remaining peripherals (secured slaves) default to secure mode but may be allocated as open peripherals by a secure master. The GPIO 448 uses the secure mode master signals to enforce allocation of the GPIO shared pins to open and/or secure masters.

The boot ROM 444 is a secure only peripheral available only in the secure environment. In some embodiments the boot ROM provides the following routines for use when operating in secure mode: 1) Secure Boot Loader; 2) Serial Controller Device Driver; 3) Synchronous Peripheral Interface ("SPI") Device Boot Driver; 4) Software Cryptographic Algorithms; 5) Secure Service Routines ("SSR"); 6) Secure Mode Transition (Entry Logic, Exit Logic); and 7) Secure Architecture Management.

For item 1, in some embodiments the reset vector for the system is contained in the secure mode controller vector table. The default value transitions to the base address of the Boot ROM. The secure boot loader then executes all required FIPS140-2 Level 3 self-tests for hardware components used during execution by the secure boot loader. In some embodiments the secure boot loader uses the HMAC-SHA1 algorithm to verify the contents of the boot ROM.

The boot loader may determine where the initial secure boot image resides based on sampled system configuration bits. In some embodiments the system supports the following secure boot image locations: Bank 0 of the memory controller 408, a serial controller interface (not shown) via GPIO or an SPI interface (not shown) via GPIO.

Once the secure boot loader determines the boot location, the secure boot image is authenticated and decrypted by the secure boot loader and placed in the I-TCM for execution. The secure boot loader changes the program counter to execute from the start of the secure boot image executable. In some embodiments, the system may operate without attached memory. For these embodiments, the serial controller memory may only contain a driver to retrieve the actual device secure application code.

For an unprogrammed device, the system may directly execute the code image from the boot source. The security bits in the non-volatile memory ("NVM") 460 may be used to determine if the device is programmed or unprogrammed. A request to program the device using the internal device key management services requires a request at reset via the DEV_PRG input signal. Since an unprogrammed device allows the manufacturer of a system to program the NVM without using the on board ROM code, the NVM may be used by that manufacturer for a different key structure.

As noted in item 2, the internal ROM may contain a serial controller driver used to configure and access the serial controller peripheral. The device driver may be used for managing read and write operations by the secure environment devices.

As noted in item 3, the internal ROM may contain a SPI driver used to configure and access the SPI interface as a boot capable device. The device driver may be used only for loading and initiating the boot sequence of the SPI interface for memory devices.

For item 4 above, in some embodiments the internal ROM provides software implementations of the one or more cryptographic algorithms. These algorithms may include, for example, DES-ECB, DES-CBC, 3DES-ECB, 3DES-CBC, DES-MAC and 3DES-MAC.

As noted in item 5 above, the system may provide several secure service routines that are used for the initialization of the system. For example, the following services may be used by secure mode processing:

Random Number Generation (FIPS186-2, RNG Seed Value)
DH Key Generation
RSA Private Key (512, 1024, 2048, 4096)
RSA Public Key (1024, 2048)
DH Public Key and Secret Key (1024, 2048)
DSA Signature and Verification (1024)
Hardware Accelerated Modular Math Library
Monotonic Counter
AES128, AES192, AES256 (ECB, CBC, CTR Modes)
HMAC-SHA1, SHA1
Device Key Management (Programming, Read)
Battery Backed Memory (Initialize, Clear, Update)
Secure Assurance Logic Management For item 6, the internal ROM contains the "entry" and "exit" logic routines used to transition between secure and open modes of operation. These routines may ensure that no secure information is exposed during a proper transition and that secure data is not corrupted during the transition from open mode to secure mode.

The "entry" and "exit" logic routines may interact with the SMC for a proper transition. The SMC may enforce the security policy for cache flushes, write buffer flushes, interrupts, MMU access, register clearing and address decoder mapping (remapped write buffer flush) in hardware.

For item 7, the secure architecture may ensure that the interactions between hardware and software do not leak information between the secure and the "open processing environments. The SMC may enforce in hardware the proper transitions. The secure architecture management routines may ensure valid configurations are used by the system. For example, the configuration and management of the following functions maybe provided by the internal ROM: I-cache and D-cache allocation, I-TCM and D-TCM page allocation, MMU allocation and configuration (through secure mode), secure abort retry (SMAU), secure assurance logic response, SMC, and invalid instruction fetch response.

Figure 6:
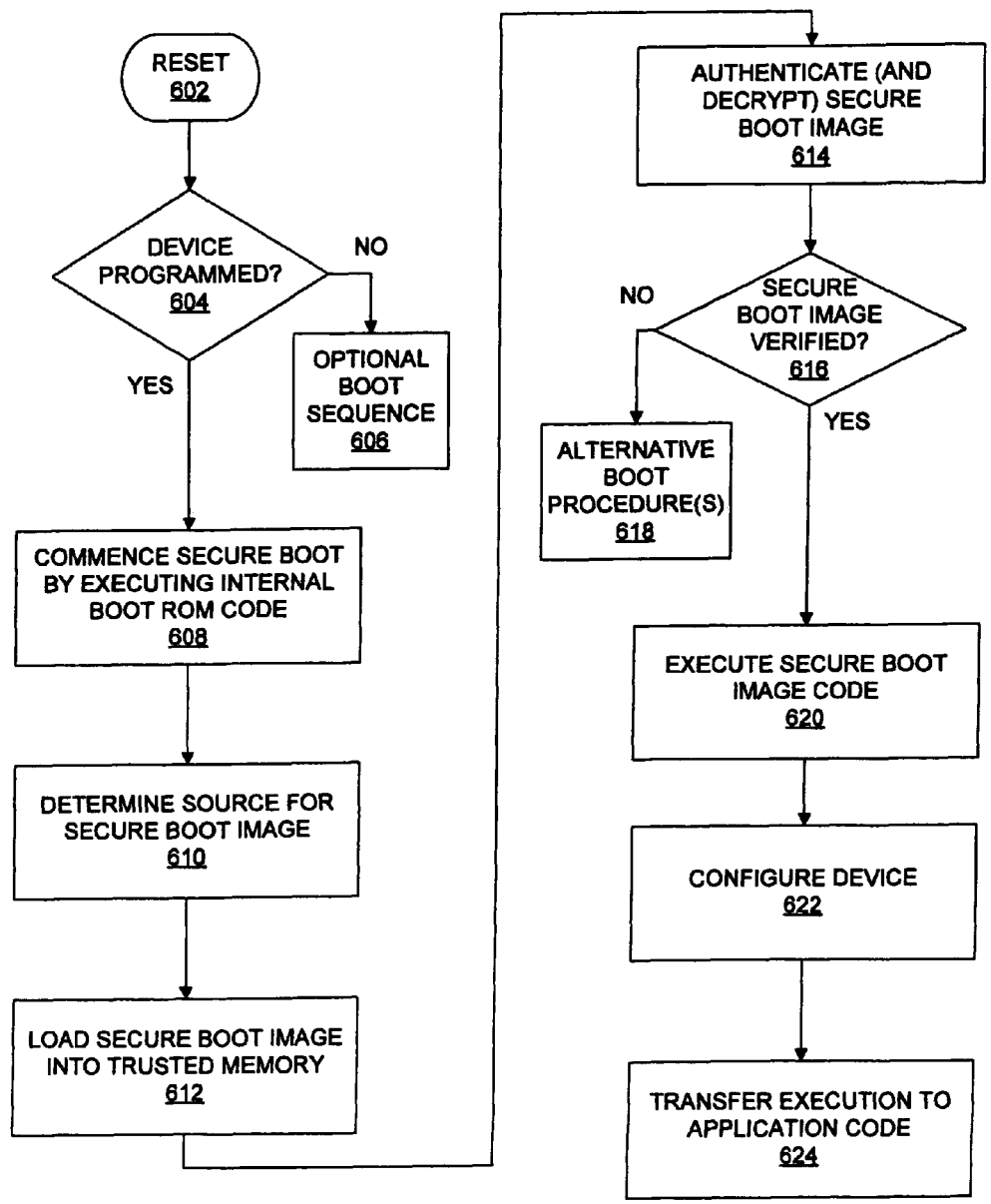
FIG. 6 is a flow chart of one embodiment of initialization operations that may be performed in accordance with the invention.

Referring now to FIG. 6 one embodiment of a secure boot sequence will be discussed in detail. After a reset (block 602), the hardware determines whether the SOC has been programmed with sensitive key material (block 604). For example, the hardware may determine whether the non-volatile memory 460 has been programmed. If not, the hardware causes the system to boot using an optional boot sequence (block 606) to, for example, boot the device for testing purposes.

If the SOC has been programmed, the hardware forces the SOC to commence execution of the secure boot sequence (block 608) stored in the internal boot ROM 444. As discussed above, the secure boot sequence may include performing self-tests and initializing selected components in the SOC.

Through the use of the secure components described herein, the boot operation may be performed in a highly secure environment. For example, the security of the boot code may be assured through the use of a masked boot ROM that may not be modified. In addition, the boot code may use key material generated using and stored in secure peripherals such as the random number generator 462, the public key engine 464 and the non-volatile memory 460.

As represented by blocks 610-618, the boot code also provides a boot loader function. The boot loader loads and verifies a secure boot image, then transfers execution to the secure boot image. The secure boot image is used to transfer control to externally encrypted and authenticated executable secure code. To ensure that the secure boot image has not been damaged or tampered with, the boot ROM code verifies the secure boot image using internally programmed unique key values prior to execution of the secure boot image.

As represented by block 610, the boot ROM is programmed to determine where the secure boot image is stored. In some embodiments the secure boot image is stored in an external flash memory or serial EEPROM. This data may be accessed, for example, via the GPIO ports at an address specified in the boot ROM (e.g., at the reset vector).

As represented by block 612, the boot code may load the secure boot image into a trusted data memory. In some embodiments this trusted memory may comprise memory in the TCM or a secure peripheral such as the SMAU.

The boot code may then verify that the secure boot image has not been compromised. For example the boot code may authenticate and/or decrypt the secure boot image (block 614) using keys stored in the non-volatile memory (e.g., OTP memory). For example, the secure boot image may be encrypted/authenticated using symmetric keys, one set of which is stored in the secure OTP memory. In this case, the encrypted/authenticated version of the secure boot image may be unique for each system (e.g., each unique chip made by a manufacturer).

If the secure boot image was not verifiable using the symmetric keys (block 616), the boot code may transfer execution to alternative boot procedures as discussed below in conjunction with FIGS. 8 and 9 (block 618).

Once the secure boot image is verified (block 620), the boot code transfers execution to the decrypted/authenticated secure boot image code stored, for example, in the I-TCM. As represented by block 622, the secure boot image has control over all security services in the system and may be used by a programmer to change keys, configure the device and enable the SMAU (or manage execution directly through manual paging). For example, the secure boot image may configure the SMAU to automatically decrypt and/or authenticate code using one or more keys ($K_{SBI}$) contained in the secure boot image. The secure boot image code may configure the memory map by, for example, designating components as secure or open. The secure boot image code also may define policy for the secure environment.

Finally, as represented by block 624, the secure boot image code transfers execution to the appropriate application code. For example, execution may be transferred to the operating system for the SOC.

The use of embedded keys $K_{SBI}$ to decrypt/authenticate the application code facilitates efficient upgrades of the SOC. For example, when a new version of application code needs to be loaded into SOCs that have been shipped to end-users, the same new application code (encrypted and/or authenticated using $K_{SBI}$) may be sent to each end-user.

Figure 7:
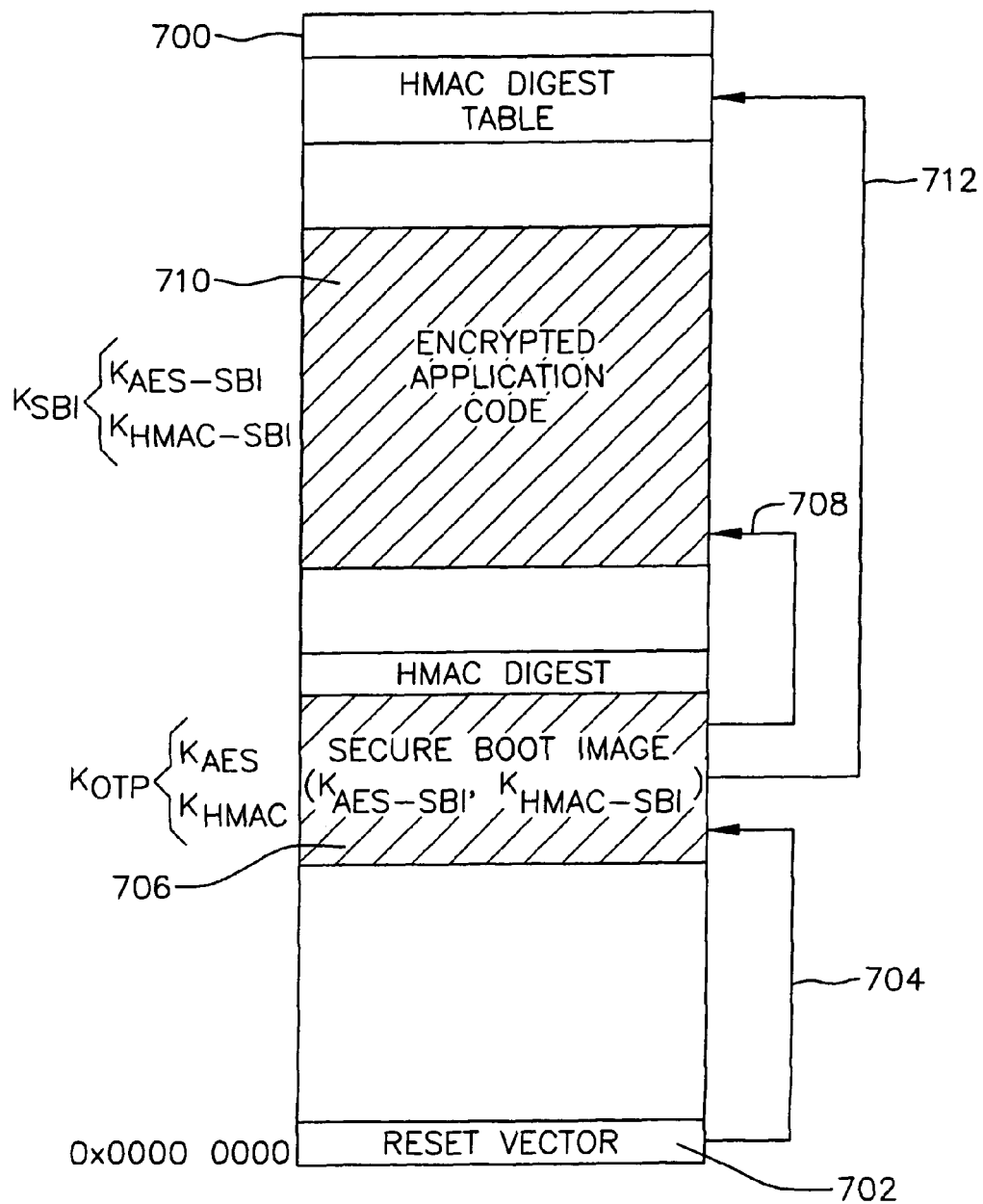
FIG. 7 is a simplified diagram of one embodiment of a secure boot image in accordance with the invention.

The above operation is described graphically in FIG. 7 which depicts one embodiment of a system memory 700. Here, a reset vector 702 includes a pointer (as represented by line 704) to the secure boot image. The secure boot image is then processed using one or more keys ("$K_{OTP}$") stored in the OTP memory. Here, an OTP key $K_{AES}$ may be used to decrypt the secure boot image. An, OTP key $K_{HMAC}$ may be used to authenticate the secure boot image. The processed secure boot image 706 is then stored in the system memory.

The $K_{SBI}$ keys may then by used to decrypt/authenticate encrypted application code 710 stored in system memory. As represented by line 708, secure boot image key $K_{AES-SBI}$ may be used to decrypt the encrypted application code 710. As represented by line 712, secure boot image key $K_{HMAC-SBI}$ may be used to authenticate the encrypted application code 710.

In some embodiments the SOC supports two optional methods of initializing the secure boot image for a unique device. The first method relates to when the secure boot image is encrypted and the second relates to when the secure boot image is authenticated. The initialization method for a given SOC may be fixed based on the value of a device configuration bit in the NVM. This bit may be set during the time of manufacture.

Figure 8:
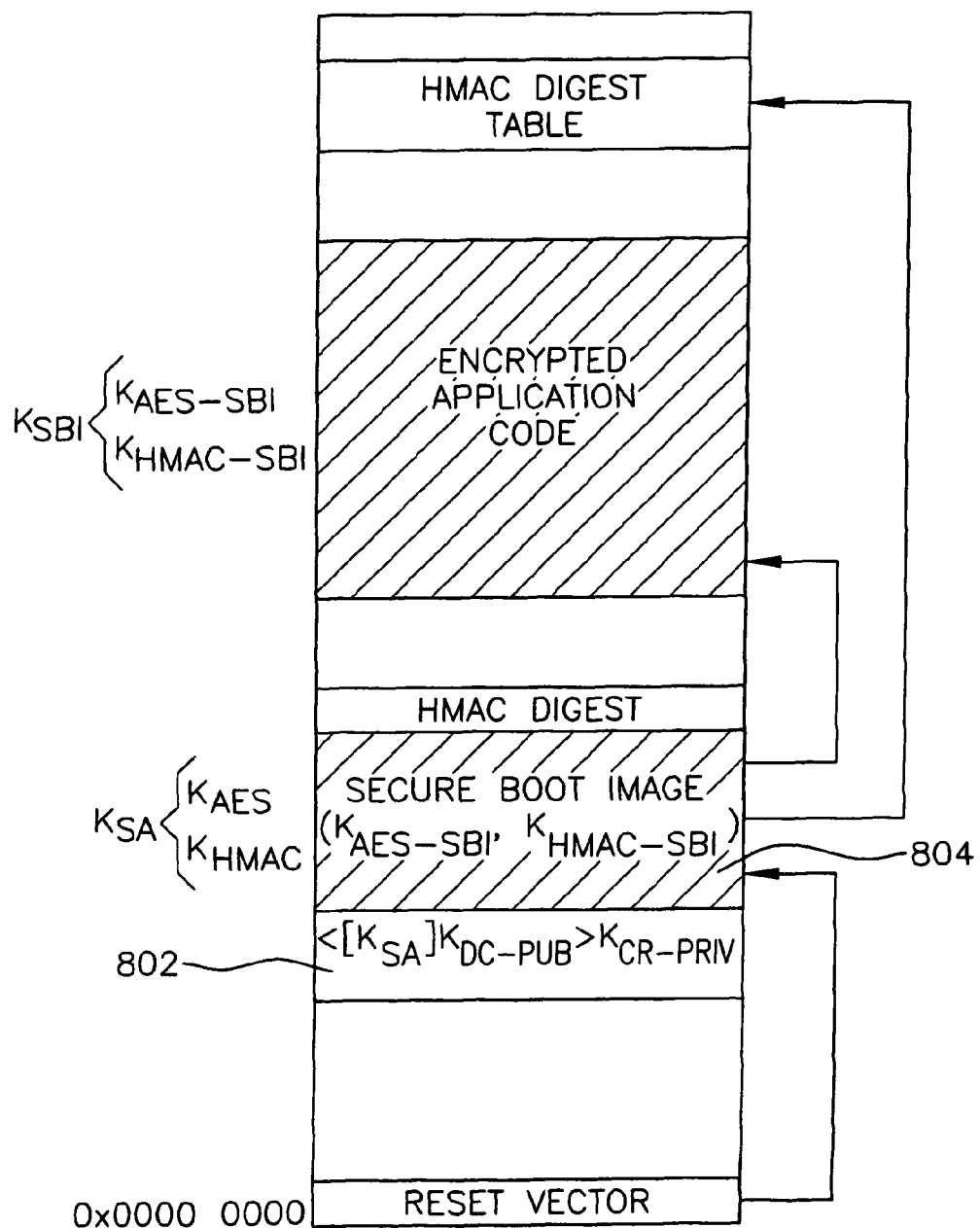
FIG. 8 is a simplified diagram of one embodiment of an encrypted secure boot image in accordance with the invention.

FIG. 8 relates to an encrypted secure boot image initialization process that may be used when the verification of the secure boot image fails using the symmetric keys stored in secure NVM. Here, the system proceeds to extract the required keys using a device confidentiality key stored in secure NVM.

The system is assigned a secure code root of trust at time of device personalization by storing an HMAC-SHA1 digest ($D_{AUTH}$) of the public key ($K_{CR-PUB}$). The system contains a unique identifying private public key pair device identity ($K_{DI-PRIV}$, $K_{DI-PUB}$) as well as a unique device confidentiality key pair ($K_{DC-PRIV}$, $K_{DC-PUB}$). These unique device keys are generated during personalization within the secure environment of the device such that the private key value is never exposed in clear text form.

The secure code root of trust must encrypt the initial secure boot image keys ($K_{SA}$) using the $K_{DC-PUB}$ value of an individual system (e.g., chip). The secure code root of trust must also digitally sign the resulting data using $K_{CR-PRIV}$ corresponding to the $D_{AUTH}$ value held by the system. This result is represented as block 802 in FIG. 8.

The system verifies the signature of the secure code root of trust and extracts the keys necessary to decrypt and authenticate the initial secure boot image 804. No further processing may be done by the internal ROM firmware. In some embodiments the initial secure boot image may contain a re-encryption routine that re-encrypts the data for storage using the unique symmetric device keys stored in secure NVM. The verified and authenticated image is executed in secure mode by the system.

Figure 9:
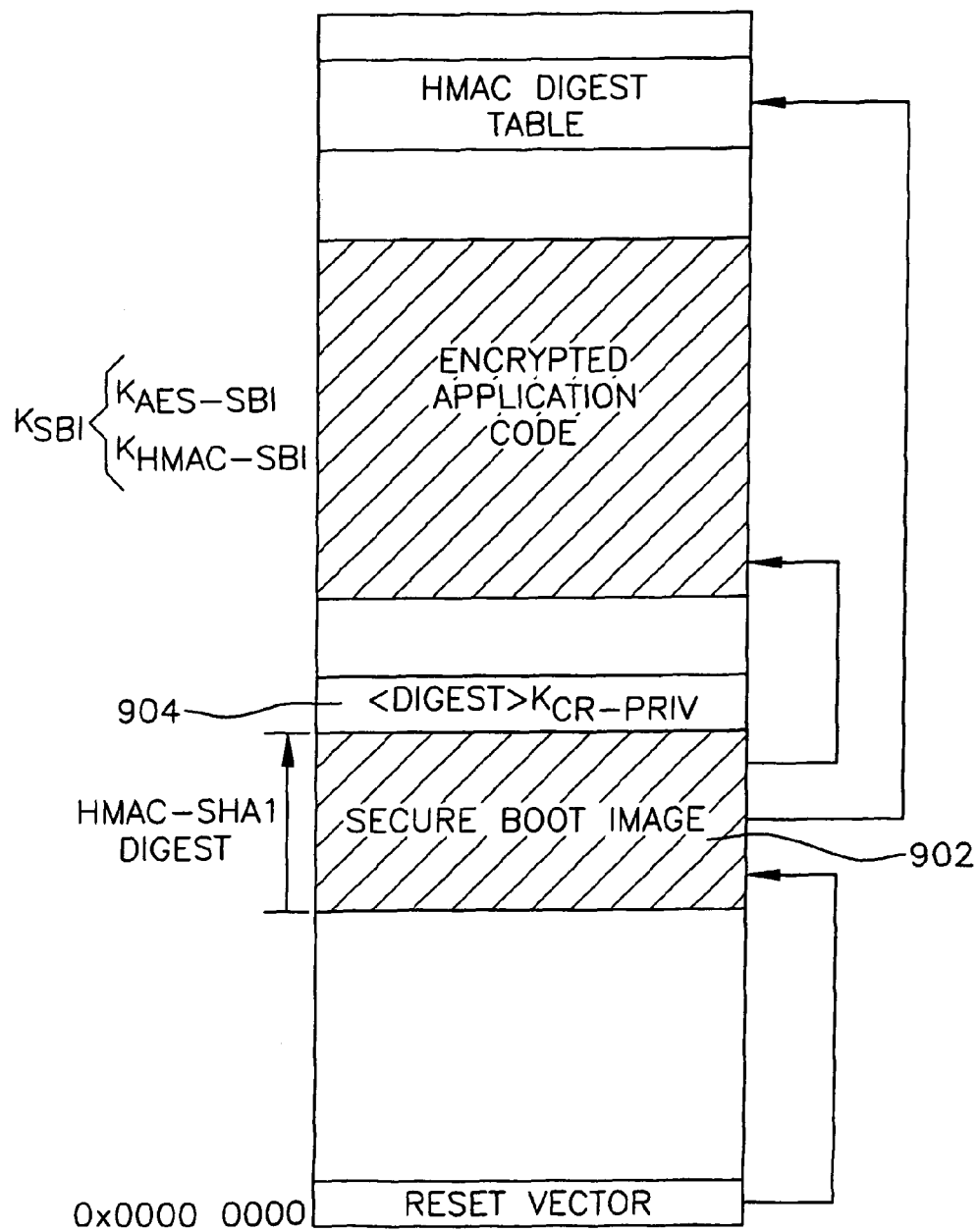
FIG. 9 is a simplified diagram of one embodiment of an authenticated secure boot image in accordance with the invention.

FIG. 9 illustrates a secure boot image initialization process that may be used when the verification of the secure boot image fails using the symmetric keys stored in secure NVM and when the authenticated initialization has been selected during NVM programming. The system then proceeds to verify the code signature of the secure boot image.

The secure boot image is only authenticated but not encrypted for this initialization process. The system is assigned a secure code root of trust at time of device personalization by storing an HMAC-SHA1 digest ($D_{AUTH}$) of the public key ($K_{CR-PUB}$).

The system verifies the signature on the digest using the secure code root of trust public key. The system authenticates the signed digest of the secure boot image using the verified digest value. The system authenticates the secure boot image 902 with the signed HMAC-SHA1 digest using the fixed HMAC-SHA1 key ($K_{CR-PRIV}$) 904 stored in boot ROM.

No further processing may be done by the internal ROM firmware. In some embodiments the initial secure boot image may contain a re-encryption routine that re-encrypts the data for storage using the unique symmetric device keys stored in secure NVM. The verified and authenticated image is executed in secure mode by the system.

Figure 10:
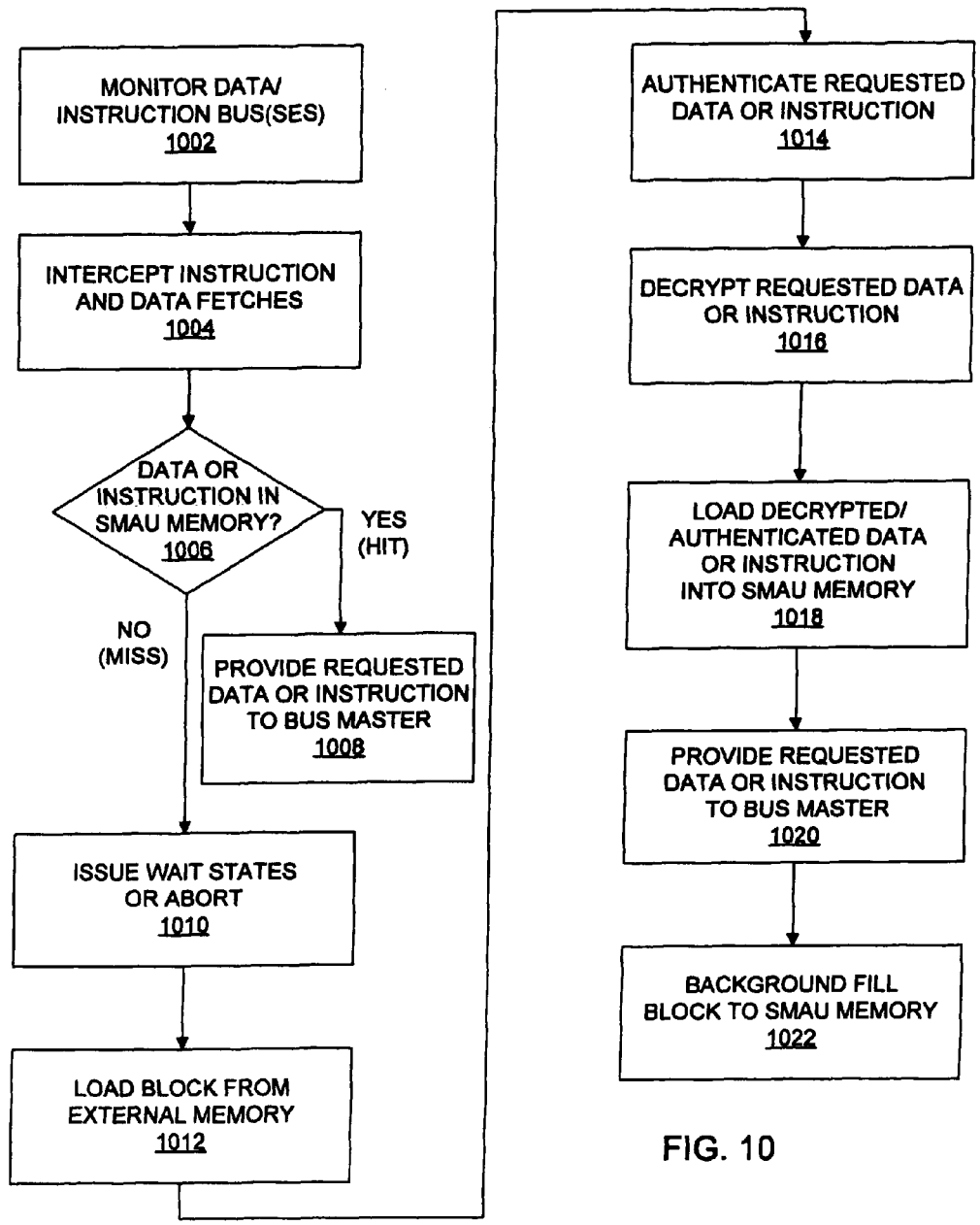
FIG. 10 is a flow chart of one embodiment of secure memory access operations that may be performed in accordance with the invention.

FIG. 10 illustrates one embodiment of secure memory access operations that may be performed in accordance with the teachings herein. As discussed above, the SMAU 406 may provide automatic encryption and authentication of executable (read-only) code for the processor subsystem. In some embodiments the SMAU functions essentially as an L2 cache (with large page sizes) for the processor.

Figure 11:
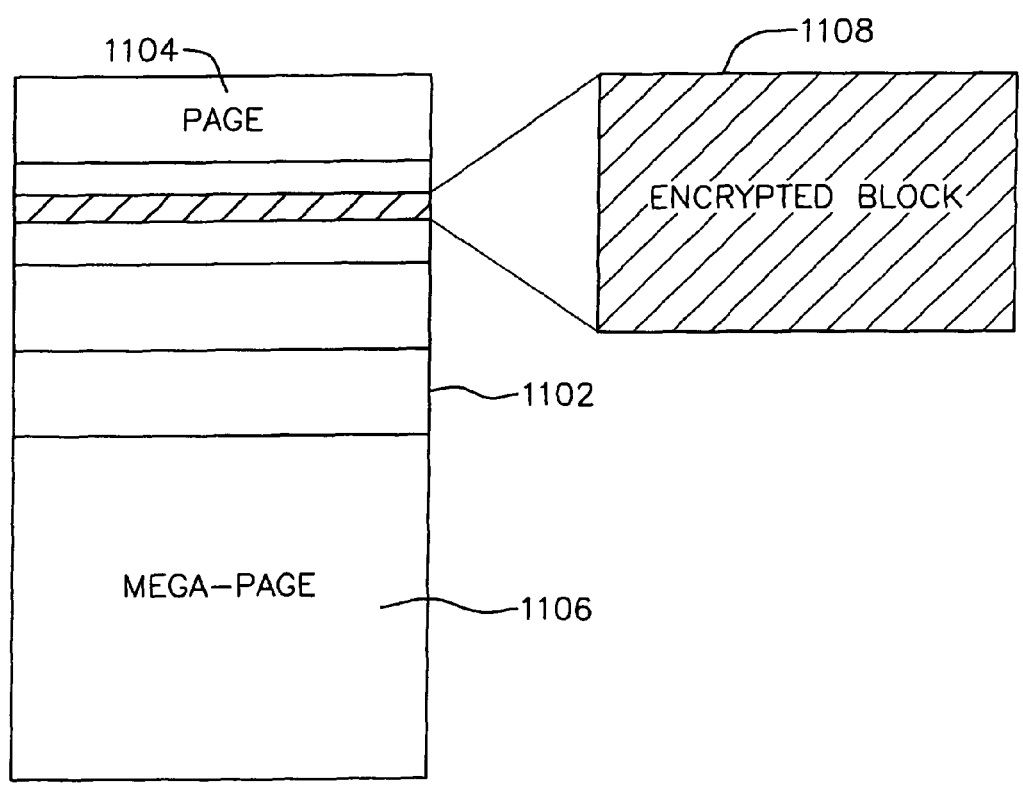
FIG. 11 is a simplified diagram of one embodiment of a secure memory access unit memory layout in accordance with the invention.

As illustrated in FIG. 11 in some embodiments the SMAU contains internal memory 1102 that is broken up into several pages. These pages may be different sizes as represented by pages 1104 and 1106. Data retrieved from code memory (e.g., an encrypted block of data 1108) is stored within a page. If desired, the internal memory of the SMAU may be directly accessed as a slave by a secure master.

Figure 12:
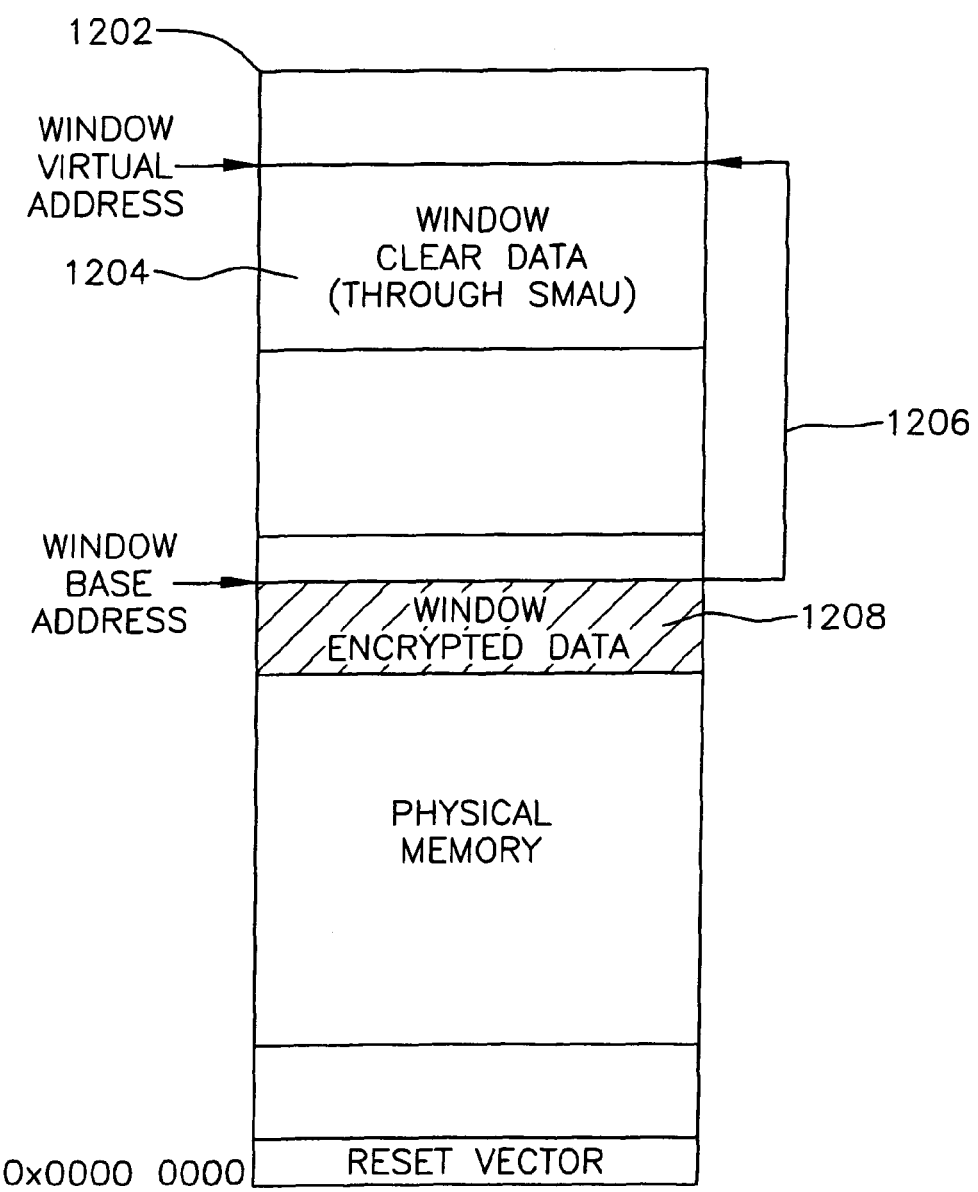
FIG. 12 is a simplified diagram of one embodiment of virtual window access in accordance with the invention.

Referring to FIG. 12, the address decoder may generate separate internal address decoder selects for the SMAU as virtual windows 1204 within a memory space 1202. The virtual windows may be used by a secure master to access external encrypted and authenticated memory through the SMAU. As represented by the line 1206, the SMAU decrypts and authenticates the encrypted data from a given window 1208 to present the data as plaintext in the virtual window 1204. The starting location and size of the virtual windows can be configured inside the address decoder. The SMAU is programmed with a window base address by the processor for each of the separate windows 1208. The base address is used by the SMAU to gain direct access to external memory as a secure master.

Referring again to FIG. 10, as represented by block 1002 the SMAU monitors traffic on the instruction and data bus or busses of the system bus 430 to determine when executable code is being accessed by a secure master.

As represented by block 1004, the SMAU intercepts instruction and data fetches made by a secure master on the bus 430. In the embodiment of FIG. 4, these fetches may be directed to external memory that is accessed via the memory controller 408.

In some embodiments the SMAU compares the address of the request by the secure master to the page base address and the block validity bits. If at block 1006 the requested clear text data or instruction is already in the SMAU memory (e.g., L2 cache 416), the SMAU forwards the clear text information as a slave for bus 430. In other words, the SMAU provides the requested information to the secure master in response to a page hit to a valid block of data in the L2 cache 416.

As represented by block 1010-1020, if the requested clear text data or instruction is not in the SMAU's memory (a page miss) the intercepted request is retrieved from the identified memory location, decrypted and authenticated by the SMAU prior to being forwarded to the requesting master. Here, the SMAU may use the $K_{SBI}$ keys from the secure boot image.

As represented by block 1010 in some embodiments the SMAU will abort the processor and block the processor request line to the arbiter to enable the SMAU to retrieve and process the requested instruction or data. In this case, after the data or instruction is loaded into the L2 cache, the SMAU releases the processor request line so that a subsequent access is a hit (see block 1020). Alternatively, the SMAU may issue wait states or use some other delay mechanism to provide the clear text information to the requesting secure master.

As represented by block 1012, the SMAU determines the target location within the SMAU of the requested data block and fetches the requested data block using the window base address (direct access to external memory). The SMAU automatically starts fetching a page based on the requested block. In some embodiments the size of an encrypted data block processed by the SMAU may be specified (e.g., 128, 256, 1 Kbyte, 2 Kbytes, etc.). The SMAU may use a single bit per block to track the valid blocks in a page. Once a block has been fetched, the SMAU updates the rest of the page as a background operation to the processor sub-system as discussed below in conjunction with block 122.

As represented by blocks 1014 and 1016 the SMAU decrypts and/or authenticates the retrieved data block based on the current SMAU configuration. In some embodiments the SMAU supports two encryption and authentication configurations: secure memory access (AES-CBC-DEC/HMAC-SHA1) and protected memory access (AES-CBC-ENC).

In the secure memory access configuration each block of encrypted data is fully decrypted and authenticated before it is forwarded to the processor. The SMAU decrypts the data using AES-CBC-DEC with an HMAC-SHA1 digest that is calculated over the encrypted code and the block address. The initial vector for the AES-CBC operation may be a bit permuted version of the access block address. The matching HMAC-SHA1 digest value may be retrieved from an external table of digest values by the SMAU. The comparison of the HMAC-SHA1 is done directly by the SMAU prior to forwarding any data to the processor.

An external table of digest values base address may be configured by the processor on a per window region. The SMAU may assume an offset for each relative block of decrypted data.

The protected memory access configuration takes advantage of the CBC encryption mode to provide a simpler and faster memory structure. The external code is "encrypted"

using the AES-CBC-ENC operation by the SMAU. Since the CBC-ENC operation is self-corrupting (versus the decryption operation is self-correcting), any attempt to modify the code within a block would corrupt the instructions.

The SMC or the processor can trap on an undefined instruction to effectively provide the authentication of the external code. The AES-CBC-ENC operation applies the authentication in a similar manner to the defined symmetric MAC operation.

The initial vector for the AES-CBC operation may be a bit permuted value based on the address of the data block. The inclusion of the address with the starting point of the data block may ensure that individual blocks cannot be moved in external memory by an attacker.

In some embodiments the SMAU incorporates an AES and HMAC-SHA1 hardware acceleration core 412 for decryption and authentication of code. These acceleration engines also may be available via the bus slave interface 410 with support (e.g., slave DMA interface 418) for the DMA controller 436.

As represented by block 1018, the decrypted and/or authenticated data or instruction may be stored in the L2 cache. In this way, the SMAU may efficiently service subsequent requests to the same block.

As represented by block 1020, the clear text information is then provided to the requesting bus master. As discussed above in some embodiments this may involve releasing the processor request line so that a subsequent access is a hit. Alternatively, the SMAU may cease the wait states or use some other mechanism to return the clear text information.

As represented by block 1022, the SMAU may background fill the last hit page. The SMAU may manage background page fills on an encrypted data block basis. The background fill operation may be done with a priority to the last page that was hit by the processor. Individual data blocks may be filled with priority given to servicing the processor requested blocks over any background fill operations. A new request to a miss data block will change where the SMAU restarts the background fill operation. The SMAU resumes the background fill operation at the next invalid data block within the last hit page. If the page is completed, the SMAU returns to the next "newest" page to resume with the background fill operation.

In some embodiments the SMAU invalidates all blocks within an entire page when the page base address of the requested data does not match any internal page base addresses. The SMUA may implement a variety of page replacement algorithms including, for example, a least recently used algorithm where the SMAU replaces the oldest page first, a random algorithm where the SMAU uses a LFSR with a free running clock to select a replacement page or a biased random algorithm where the random replacement algorithm is used, but it is biased to ignore the selection of the megapage 1 in "n" times where "n" can be programmed by the processor.

The SMAU may support a pre-fetch trigger on a per page basis. For example, the processor may write the pre-fetch trigger for a specific page to initiate a background fetch of data within that address range. The address provided by the processor can be at any location within the page. The SMAU will start filling the page at the requested data block location written by the processor. An additional pre-fetch trigger register may be provided in which the SMAU selects the page to evict based on the replacement algorithm.

The SMAU pages may be locked on a per page basis. The page can be locked prior to completely filling all of the invalidated blocks within the page. The SMAU will continue to fill a locked page in the background.

The SMAU also may provide decryption and authentication code services to other components in the system. In some embodiments the access priority internal to the SMAU is: 1) direct slave access to the internal SMAU memory; 2) hit/miss processing; 3) slave hardware acceleration access; 4) background page fill.

The SMAU may incorporate a dedicated write only key cache that is used for secure paging operations. The SMAU hardware accelerator core will interrupt any slave operations at a given block size (e.g., AES block size) to schedule a paging operation. Since the paging operation has a dedicated key cache location, the keys are already scheduled (pre-computed) for the transaction. All state information for the slave access is maintained by the SMAU during the secure page operation. The slave operation will complete normally after the secure paging operation has been serviced.

The HMAC-SHA1 state may be handled in a similar manner as the encryption operation when switching between a slave request and a secure page request. The SMAU may be configured to completely finish the slave operation before servicing the secure page request.

Figure 13:
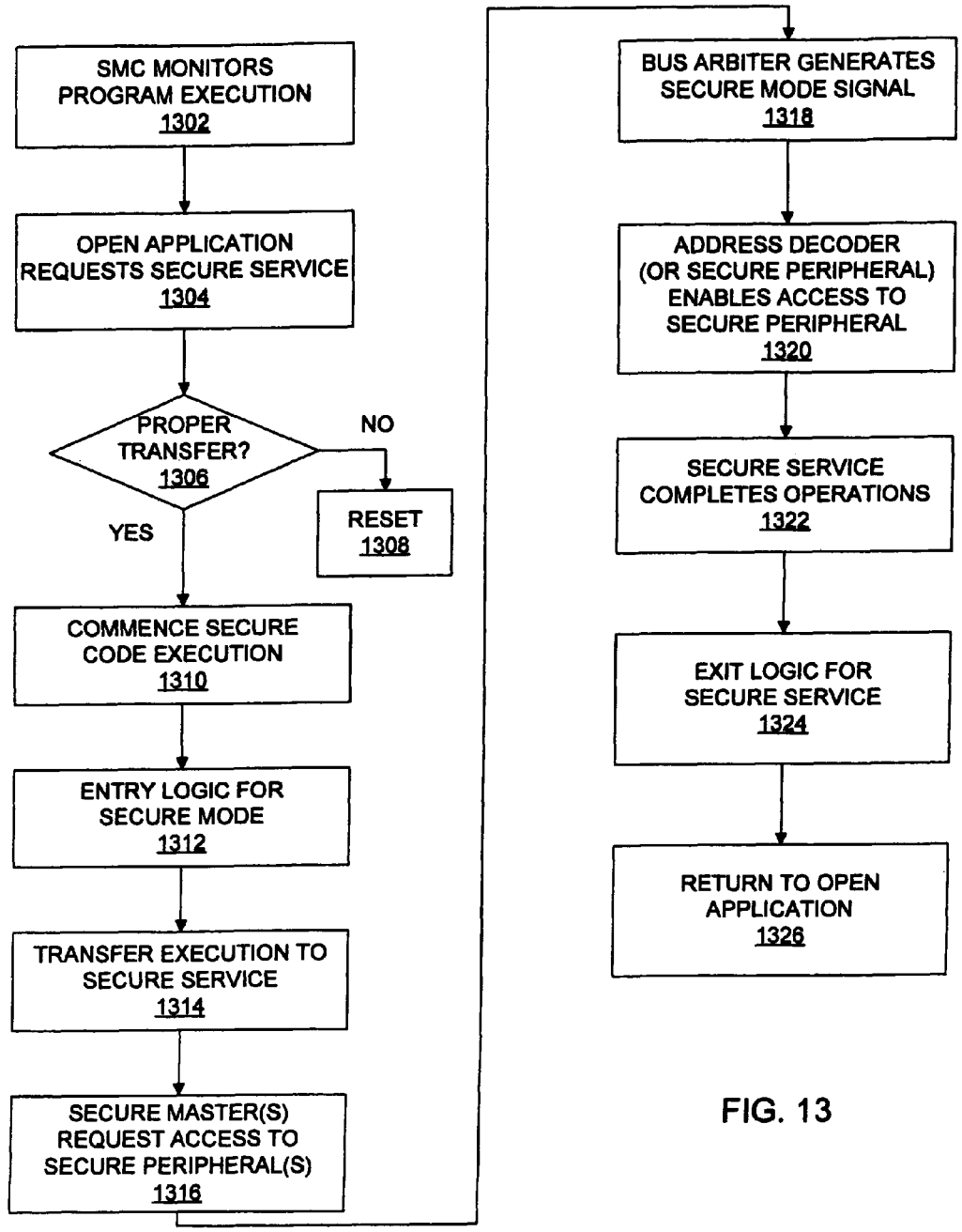
FIG. 13 is a flow chart of one embodiment of mode switching operations that may be performed in accordance with the invention.

Referring now to FIG. 13, one embodiment of procedures that may be performed to switch between open and secure operating modes will be discussed. As represented by block 1302, the secure mode controller monitors program execution to determine when a mode switch is initiated.

In open mode, the bus arbiter generates a secure mode master signal that indicates that the current bus master is an open master. As a result, the address decoder will only generate peripheral selects for open peripherals as defined by the memory map. For example, when the processor is operating in open mode, the secure mode controller provides a signal to the bus arbiter indicative of such. As a result, attempts by the open mode processor to access a secure peripheral will not result in the corresponding peripheral select signal being generated by the address decoder. In this way, hackers or viruses that have infiltrated the system are not allowed access to sensitive data or processes used or maintained by the secure peripherals.

As represented by block 1304, a mode switch to secure mode may be initiated when an open application requests a secure service. In some embodiments this may be accomplished via a software interrupt. It should be appreciated, however, that other mechanisms (e.g., a predefined function call, a hardware interrupt via a register access, setting a flag in a data memory, etc.) may be used to initiate a mode switch.

As represented by block 1306, the secure mode controller monitors program execution to ensure that the interrupt causes the processor to fetch program code from a specific address. In this way the secure mode controller may ensure that the processor is now executing trusted secure code.

If the expected program execution transfer did not occur, the secure mode controller may takes steps to prevent the processor from continuing the current program execution. For example, as represented by block 1308 the secure mode controller may initiate a system reset.

As represented by block 1310-1314, the processor commences execution of the secure code to perform the entry logic operations as discussed above and transfer execution to the requested secure service. Here, the secure mode routine may save all state information that was being used by the open mode to ensure that this information does not get corrupted by the secure mode processing operations. In addition, the secure mode routine may clear certain registers and memory locations (e.g., the instruction cache) to ensure that data from the open mode is held and it not written to the secure environment.

As represented by block 1316, in secure mode one or more secure bus masters may request access to one or more secure peripherals. When the processor requests the bus, the secure mode controller provides the appropriate signals to the bus arbiter to inform the bus arbiter that the processor is executing in a secure mode.

As represented by block 1318, the bus arbiter will generate the secure mode master signal that enables the secure masters to access secure peripherals. For example, the bus arbiter will generate the secure mode master signal when the processor operating in secure mode attempts to access secure program code managed by the SMAU.

As represented by block 1320, the address decoder enables a secure master to access a secure peripheral based on the peripheral address map and the state of the secure mode master signal. For example, when the secure mode master signal indicates that the current bus master is a secure master, the address decoder may generate a peripheral select signal for the requested secure peripheral.

In addition, a secure peripheral may use the secure mode master signal to grant or deny access to a portion or all of the peripheral. For example, certain registers in an otherwise open peripheral may be designated as secure registers. This, the peripheral may enable a bus master to access these registers only when the secure mode master signal indicates that the current bus master is a secure master.

As represented by block 1322-1326, once the secure service completes its operations, program execution is transferred to the exit logic discussed above. The exit logic then returns from the interrupt and program execution continues from where it left off in the open mode. Accordingly, the request for secure services is invoked by an open mode application in a similar manner as any other open service. As a result, the secure services may be added to a SOC with little impact on the normal operations of the SOC.

Figure 14:
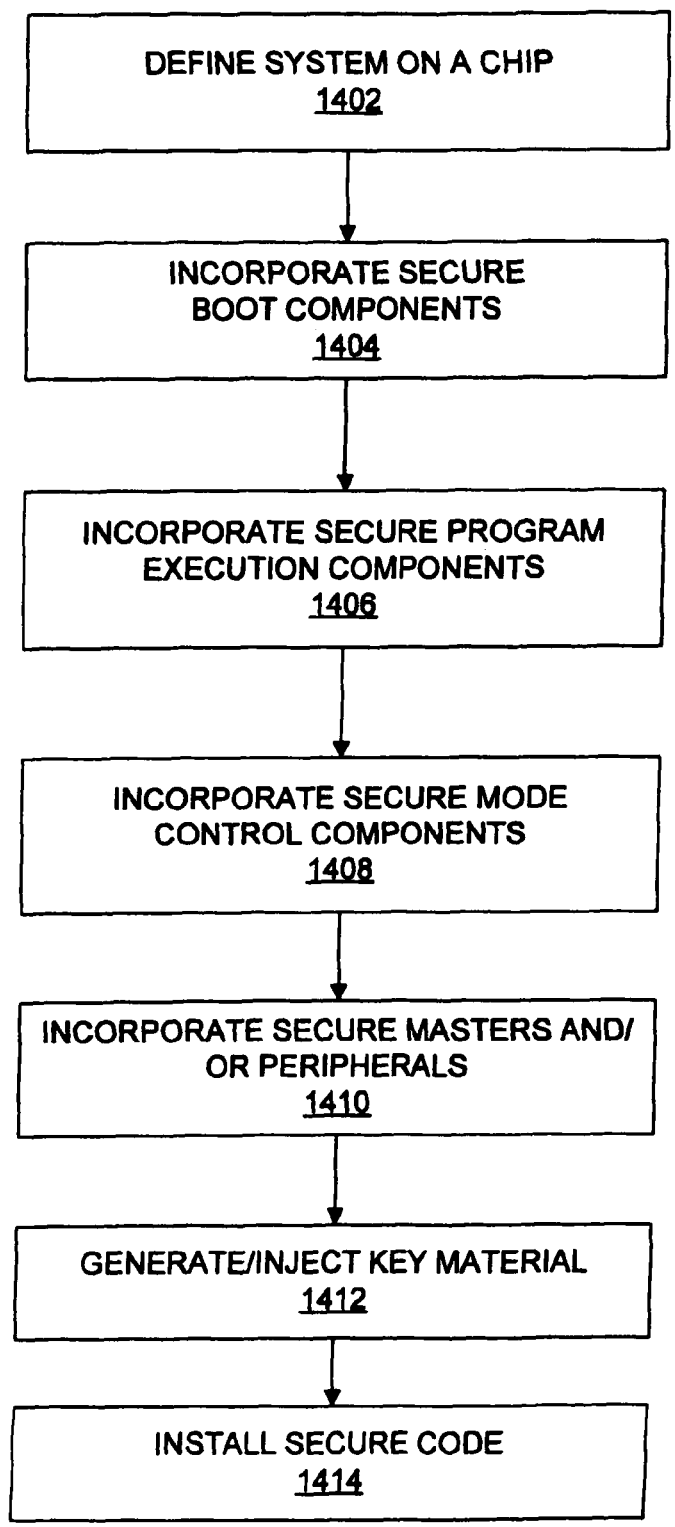
FIG. 14 is a flow chart of one embodiment of operations that may be performed to incorporate secure services into a system on a chip in accordance with the invention.

Referring now to FIG. 14, one embodiment of a procedure for modifying an embedded processor such as a system on a chip to also provide one or more secure operating modes will be discussed. In this example the original SOC design performs functions other that security functions. For example, the SOC may be defined to provide an operating system and application code for an end user device such as a cell phone, a PDA, etc., (block 1402).

Secure capabilities such as those that involve processing sensitive data may then be added to the SOC such that the sensitive data is protected by hardware. Typically, this sensitive data may be protected by or used during cryptographic processes. The modified system thus supports the original features along with security features in a manner that has little or no effect on the operation of the original system.

As represented by block 1402, one or more security peripherals as discussed above may be incorporated into the SOC.

For example, a non-volatile memory (NVM) 460 that is only accessible to secure masters may be incorporated into the SOC. In some embodiments the non-volatile memory 460 comprises a one-time programmable ("OTP") memory. Since the OTP is designated as a secure peripheral, data stored in the OTP is protected by the hardware boundary of the system. Thus, this memory may be used to securely store sensitive data (e.g., key material) that is used to ensure the integrity of the secure mode operations and for various cryptographic operations.

In some embodiments the NVM block contains two types of one-time programmable memory. A 6-T cell is used for storing long term secure data (e.g., key material) and a 2-T cell is used to provide a monotonic counter in the system. In some embodiments the "6T" OTP may be used for storage of the following information:

$D_{AUTH}$—Authorization used by the system for signature verification.

$D_{CFG}$—Device configuration information.

$K_{AES}$—Unique AES encryption key used for protection of locally stored non-volatile data specific to the system.

$K_{HMAC}$—Unique SHA1-HMAC authentication key used for protection of locally stored NV data specific to the system.

$K_{DI-PRIV}$—Unique DSA Signature Key used to securely identify a specific system.

$K_{DC-PRIV}$—Unique DH 256-bit exponent 2048-bit modulus confidentiality key.

The $D_{AUTH}$ and $D_{CFG}$ are presented to the system during "6T" OTP programming to set the configuration or personality of a particular device (e.g., chip). The $K_X$ values are all generated by the SOC using the secure internal random number generator 462 and appropriate post processing of random data per the required key generation specifications in FIPS140-2. This processing may be performed, for example, by the secure public key engine 464. Except for public keys of asymmetric key pairs, the internally generated key values are not accessible outside the hardware protected security boundary of the system (e.g., chip).

The internal 6-T OTP block may be programmed using the programming interface in the NVM block. The processor programming routines ensure that the OTP array is completely clear by reading and writing the 6-T array programming. If the array is clear, a single security bit is programmed first before programming any other bit elements.

The device long term keys are verified by reading the device key cache locations to ensure they are correct. Once verified, the second security bit is programmed by the processor to complete the initialization process. The NVM will not mark the long term keys as valid unless both security bits have been programmed.

The system requires an external high voltage pin to be active during the programming of the OTP array. If this pin is not active, the next power cycle will clear all of the programmed values.

The programming logic will not re-program an array unless the array is blank or both security bits indicate that it has been programmed correctly. If the array has been programmed correctly, a re-programming of the array is allowed since the structure of OTP only allows the bit to be cleared. The clearing of bits in the OTP array is a destructive process.

In some embodiments programming of the OTP may take place during chip manufacture or at the customer manufacturing location. In this way, the security of the SOC may be effectively authenticated by, for example, the manufacturer of the SOC or an OEM that incorporates the SOC into a system.

The "2T" OTP array may be used as a monotonic sequence number (CMSN) for protection of data that is stored encrypted by the system. The internal 2-T OTP block may be programmed by the processor. The 2-T cell may require that the unprogrammed bits are read first until a row with programmed bits is found. The last programmed bit location represents the monotonic counter "count value". By scanning the clear bits first, the number of reads on any single bit is limited increasing the reliability of the 2-T cell. A reset sequence may be tracked (external to the NVM block) to ensure that the value is updated every, for example, 1000 resets.

A hardware state machine scans the array after reset to determine the current monotonic counter value. For example, the counter value is valid following a given number of cycles after reset.

In some embodiments the reporting of public key values is only available using the internal boot ROM code when the monotonic counter value (2-T OTP) is zero. Here, further reporting of the public key value may be handled using the secure code executing on the system. The system reports the public key upon request during the boot process.

The public key values may be written to the highest sequential address location of the secure boot image. The $K_{DI-PUB}$ value is reported along with the $K_{DC-PUB}$ signed by $K_{DI-PRIV}$ ($<K_{DC-PUB}>K_{DI-PRIV}$).

In some embodiments the public key acceleration core 464 provides acceleration for the Diffie-Hellman public key exchange and the digital signature (DSA) operation. The performance, size and function of the block can be scaled to meet the demands of any system. In some embodiments the public key engine 464 provides complete algorithmic processing of Diffie-Hellman, RSA and DSA public key commands.

The public key core 464 may be accessed using the public key acceleration commands provided by the system to the host for application key acceleration. In some embodiments the access is provided as an indirect command to the local host. Here, the host cannot directly access any of the functions provided in the public key acceleration core.

The random number generator 462 may be a "true" random source. For example, it may utilize free running oscillators to capture thermal noise as the source of randomness.

In some embodiments the random number generator is used as a source for seeding FIPS approved pseudo-random number generators as the initial secret value. The random number generator is controlled via configuration registers. It generates one bit at a time into a capture register that is accessible to a secure master. The value from the random number generator is post processed by the processor using SHA-1.

The secure protect logic 466 protects against system security attacks. Several system monitors are coupled with the basic design to ensure that common active hardware attacks can be resisted by the system.

The protection circuits trigger a reset of the system. The reset wipes out all transient state information in the system including clearing all transient keys and state information within the system. The secure OTP and the battery backed memory are not cleared by the reset. The source of a security protection logic event is provided through a reset cycle by the SPL block.

A low frequency protection circuit in the secure protect logic 466 ensures that the operating frequency of the system does not fall below a given threshold. This ensures that the time tick register value can not be compromised within the limit of a reference frequency.

The system clock is protected to an accuracy of, for example, approximately 3 times. The low frequency protection circuit makes dynamic attacks to attempt to read values within the system while operating much more difficult. In this case, the higher the threshold value, the better protection that is provided.

The low frequency protection is disabled until the NVM (secure OTP configuration) has been properly programmed (i.e. disabled during manufacturing tests). The low frequency monitor can be factory configured as default disabled on power up.

An operating point protection circuit in the secure protect logic 466 is provided to ensure that all logic within the system operates as designed for all process, voltage and temperature conditions (or across all operating points). The protection circuit ensures that an attacker cannot change the operating point such that a timing path is violated in the system ensuring that the system always operates as designed.

A watchdog timer in the secure protect logic 466 is used to ensure secure processing returns. The watchdog timer is time tick based on the bus operating clock. If the watchdog timer ever gets to zero a reset is issued to the system. The watchdog timer can be enabled and disabled as a reset source by a secure master.

The secure protect logic 466 provides protection against multiple reset attacks using a reset monitor. The reset monitor uses a timer based on the time tick register increment that requires at least one tick before allowing more than, for example, 16 resets to occur. If more than 16 resets occur within the time tick, the system will require at least 2 time ticks before releasing the 16th reset.

The reset protection is disabled until the NVM has been properly programmed (i.e. disabled during manufacturing tests). The reset monitor can be factory configured as default disabled on power up.

The "time tick" reference is provided by the low frequency reference clock (non-correlated with the system clock). The reset protection logic is sampled by the boot code to ensure that only one reset has occurred during the execution of the internal ROM code before exiting to the security function routines. The boot code further delays "n" random clock cycles before exiting to the secure boot image.

Referring again to FIG. 14, as represented by block 1406 one or more secure program execution components also may be added to the SOC. These components may be used to provide a mechanism for the SOC to execute trusted secure code in the secure mode. For example, as discussed above a SMAU may be incorporated into the SOC to automatically decrypt and authenticate code that is to be executed during secure mode.

As represented by block 1408 one or more secure mode control components may be incorporated in the SOC. These components may be used to enforce the execution of secure code during secure mode and to enforce, in hardware, a security boundary between the open and secure components. For example, as discussed above a secure mode controller may be incorporated into the system. In addition, the bus arbiter, address decoder and peripherals may be modified to support a multi-mode address map, secure and open bus masters and peripherals and associated signaling.

As represented by block 1410 in some applications one or more secure masters and/or secure peripherals maybe added to the system to support secure services. For example, some applications may incorporate an RFID reader for securely receiving a user's credentials, credit card information, etc.

After the SOC chip is manufactured, key material may be stored in the SOC (e.g., in the OTP) as represented by block 1412. In some embodiments this key material generated internal to the SOC as discussed above. In addition, key material may be injected into the SOC. Typically, the latter scenario would take place under secure conditions.

As represented by block 1414, secure code may be installed into the SOC and/or in external memory that may be accessed by the SOC. This secure code may include, for example, secure boot ROM code, secure boot image code and secure application code. As discussed herein, this code may be encrypted and/or authenticated using the keys discussed herein (or complementary keys) before it is stored in data memory.

It should be appreciated that any type of application may be loaded into device depending on the requirements of the SOC. For example, the SOC may comprise a baseband processor chip in a wireless device such as a cell phone. In this case, the application software may include an operating system for the cell phone and secure software may be added to encrypt, decrypt, authenticate, etc. data sent to/from the cell phone. Here, both the operating system and the secure software may be executed by the baseband processor. In some applications the SOC may comprise a processing system in a cable/satellite set top box. Here, the application software may include an operating system for the set top box and secure software may be added to cryptographically control access to video and other media programming. Both the operating system and the secure software may be executed by a processor in the processing system. In some applications the SOC may comprise an Ethernet controller. Here, the application software may include an operating system to be executed on a MIPS processor in the controller. In addition, the MIPS processor may be configured to execute added TPM software to provide secure services. In some embodiments the SOC may comprise a network processor chip that includes a processor. Here secure services may be added to the SOC so that the processor executes both conventional network processing operations and key management operations. In some embodiments the SOC comprises a wireless media access controller for a wireless device. Secure services may be added to the SOC so that a processor executes both conventional wireless network processing operations and secure operations (e.g., encryption, decryption, authentication, etc. of data sent to/from the wireless device).

FIG. 15 illustrates one embodiment of a process that may be used to manufacture a device (e.g., a chip) constructed in accordance with the invention where steps are taken to ensure that the security model is not compromised. This process involves programming and registering a blank device (block 1502).

The programming of the 6-T OTP (block 1504) is typically done during final test for manufacturing the blank device. As represented by block 1506, the configuration and activation values ($D_{AUTH}$) may be programmed into the device using a standard test program. The high voltage pin VPP must be active during the programming process for the values to be burned into the OTP.

The device may generate several of the keys discussed above (e.g., $K_{DI-PRIV}$, $K_{AES}$, $K_{MAC}$, etc.) internal to a security boundary of the device. The key values are never exposed by the device outside of the security boundary.

Registration of the device (block 1512) requires that the value of $K_{DI-PUB}$ be entered into a secure database 1514 that verifies the integrity of the manufactured device. The database contains a list of all valid manufactured devices.

The values of $K_{DI-PUB}$ are collected in a manner that ensures it is difficult for someone to subvert the process and procedures used to manufacture the devices for the purpose of registering public key values to which they know the private key pair. For example the database of valid public keys may be collected in a controlled secure environment 1510. Once collected, these public values can be transferred outside of that secure environment by using a warranty server 1516 to sign the $K_{DI-PUB}$ value to indicate that the $K_{DI-PRIV}$ value was generated inside the hardware protected security boundary of a device. In this example the warranty server 1516 signs the $K_{DI-PUB}$ value with its private key $K_{W-PRIV}$ and stores the result along with a warranty certificate in a publicly accessible database 1520.

The registration of $K_{DI-PUB}$ should be performed in a manner that ensures it is difficult for someone to get an invalid $K_{DI-PUB}$ registered. Registration may be performed, for example, when the device is being manufactured or when the device is being installed in a larger system (e.g., when an OEM installs the device on a circuit board).

When registration is performed during the manufacturing process of the silicon device, initialization may be performed during final test of the packaged parts. After the generation of $K_{DI-PRIV}$, the device reports $K_{DI-PUB}$ to a warranty key server 1516 via a physically private connection. The warranty key server generates a warranty certificate indicating the $K_{DI-PUB}$, location, time, date, etc. of the manufactured device.

The warranty key server may include a tamper resistant protected hardware security module ("HSM") to ensure the integrity of the private key ($K_{W-PRIV}$) used for warranting the devices. The private connection should be physically secure via process and procedures for manufacturing the device to ensure that invalid $K_{DI-PUB}$ values are not submitted to the warranty key server.

The device includes a secret HMAC key ($K_{MFG}$) embedded in the internal ROM of the device inside the security boundary. The device reports both the value of the public key ($K_{DI-PUB}$) and an HMAC-SHA1 hash digest of the public key using the embedded secret key. The value of $K_{MFG}$ is only known by the HSM that verifies the values signed by the warranty server. In general, it is not included in the HSM that is used on the test floor for signing the $K_{DI-PUB}$ values of the device. While this value may be constant across all of the devices manufactured, compromising the device at this point would require someone to reverse engineer the internal ROM of the device and have physical access to the test floor to insert an invalid public key.

The procedures in place for the protection of the warranty server (which would typically reside on the test floor within the test cage) may include the capability to revoke $K_{W-PRIV}$ with a minimal window of exposure (limited amount of material required to be scrapped).

The protection of the $K_{W-PRIV}$ may be enhanced using a second layer of signatures and certificates. The second layer of certificates may require that a batch of certificates for a particular wafer lot (or wafer lots) of devices is signed by a second manufacturing key $K_{M-PRIV}$ to narrow the window of exposure in the event that $K_{W-PRIV}$ is comprised through physical attack (i.e. the server is stolen and the integrity of $K_{W-PRIV}$ is unknown). This can also be accomplished by remotely connecting the warranty server using a secure virtual private network ("VPN") or other methods.

The registration of the device may be performed during the manufacturing process at the OEM using a similar process outlined above. The procedure may again require a private connection between the key server via the techniques outlined in the previous section. The device programming may also be done by the OEM provided the external voltage is applied during the programming.

After the device has been registered (block 1522) and incorporated into an end user product, the product may be used to provide secure service using the keys discussed above to provide the secure root for various cryptographic operations.

From the above it should be appreciated that a system constructed in accordance with the teachings herein may be used in a variety of applications. For example, in some applications a system on a chip may be used to process data from input devices such as sensors (e.g., biometric sensors including fingerprint readers, iris sensors or facial recognition sensors). Moreover, through the use of the added cryptographic processing the input data may be processed in a protected environment. Thus, the biometric template may be verified within a protected security boundary of the system. In addition, the system may provide additional security processing such as password and key management functions that are authorized by the template match processing.

In some applications the system may be used to implement a standalone trusted platform module. For example, trusted platform module code may be loaded into the secure environment of the system. The flexibility of the secure code execution insures that the trusted platform module code base may be updated and expanded to provide any type of key management interface in combination with the standard trusted platform module implementation. Additional functions and features such as secure transaction processing for credit cards, etc., also may be provided by the trusted environment of the system simultaneously with a trusted platform module implementation.

In some applications the system may be used to process security protocol key establishment algorithms such as Internet Key Exchange (IKE) used in IPsec applications. The key negotiation may be executed within the trusted environment of the system to establish a session key. The session key may then be transferred securely using a symmetric or asymmetric cryptographic accelerator that may be securely connected to the system. The certificate and key management functions execute on the system within the secure boundary. The resulting key may be transferred securely to, for example, an accelerator that is located on the same chip or an accelerator that includes cryptographic processing to facilitate secure (e.g., encrypted) key transfers. The accelerator may then use that key while protecting the clear text value to accelerate IPsec and SSL (or other asymmetric or symmetric data operations).

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire while other signals may consist of light pulses transmitted over an optical fiber.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

The components and functions described herein may be connected/coupled directly or indirectly. Thus, in some embodiments there may or may not be intervening devices (e.g., buffers) between connected/coupled components.

A wide variety of devices may be used to implement the data memories discussed herein. For example, a data memory may comprise RAM, ROM, registers, Flash memory, one-time-programmable ("OTP") memory or other types of data storage devices.

In summary, the invention described herein generally relates to an improved processing system. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A method for secure processing in a secure processing system having a processor and a plurality of secure operating modes, comprising:

generating, using a cryptographic processor, a set of cryptographic keys, wherein the cryptographic processor is within a security boundary of the secure processing system;

determining, responsive to a reset signal, whether a secure memory has been programmed with key material;

selecting one of a plurality of boot sequences responsive to determining that the secure memory has been programmed with key material, wherein a first boot sequence in the plurality of boot sequences designates a first subset of memory locations accessible in a first secure operating mode, and wherein a second boot sequence in the plurality of boot sequences designates a second subset of memory locations accessible in a second secure operating mode;

authenticating boot code for the selected boot sequence using a first key in the set of cryptographic keys;

configuring a memory map designating open and secure memory locations based on the selected boot sequence;

defining a policy for a selected secure operating mode based on the selected boot sequence;

enforcing the selected secure operating mode using components within the security boundary, wherein enforcing the selected secure operating mode comprises:

blocking access to secure peripherals based on the configuration of the memory map;

decrypting secure code to be executed in the selected secure operating mode using a second key in the set of keys, and storing secure data for the selected secure operating mode in memory encrypted with the second key; and generating a signal enabling access of a master, configured to operate in the selected secure operating mode, to a memory location when the memory location is within a subset of secure memory locations corresponding to the selected secure operating mode.

2. The method of claim 1, wherein the first secure operating mode is enforced using a secure mode controller.

3. The method of claim 1 further comprising authenticating secure application code for the selected secure operating mode using a secure memory access unit.

4. The method of claim 1 further comprising storing key material for the selected secure operating mode in a one-time-programmable memory within the security boundary of the secure processing system.

5. A system for enforcing a secure operating mode, comprising:
   a key generation module within a security boundary of the system for generating a set of cryptographic keys;
   a secure memory configured to securely store the set of cryptographic keys within the security boundary;
   a secure memory access unit configured to:
      authenticate boot code using a first key in the set of cryptographic keys, and
      decrypt secure code using a second key in the set of keys;
   a boot loader configured to:
      determine, responsive to a reset signal, whether the secure memory has been programmed with key material,
      select one of a plurality of boot sequences responsive to determining that the secure memory has been programmed with key material, wherein a first boot sequence in the plurality of boot sequences designates a first subset of memory locations accessible in a first secure operating mode, and wherein a second boot sequence in the plurality of boot sequences designates a second subset of memory locations accessible in a second secure operating mode,
      configure a memory map designating open and secure memory locations in the system based on the selected boot sequence, and
      define a policy for a secure operating mode based on the selected boot sequence;
   a secure mode controller configured to enforce the secure operating mode using components within the security boundary by blocking access to secure peripherals by processes executing in an open environment; and
   a bus arbiter configured to generate a signal enabling access of a master, configured to operate in the selected secure operating mode, to a memory location when the memory location is within a subset of secure memory locations corresponding to the selected secure operating mode.

6. The method of claim 5, wherein a component select signal is selectively enabled or disabled based on the signal enabling access of the master and a secure service or a secure peripheral to be accessed.

7. The system of claim 5, wherein an exit routine performs clean-up operations before a transition to an open operating mode.

8. The system of claim 5, wherein the bus arbiter is configured to:
   grant bus master privileges to the master.

9. A method for providing secure processing in a secure processing system having an open environment and a secure environment, comprising:
   generating, using a cryptographic processor, a set of cryptographic keys, wherein the cryptographic processor is within a security boundary of the secure processing system;
   determining, responsive to a reset signal, whether a secure memory has been programmed with key material;
   selecting one of a plurality of boot sequences responsive to determining that the secure memory has been programmed with key material, wherein a first boot sequence in the plurality of boot sequences designates a first subset of memory locations accessible in a first secure operating mode, and wherein a second boot sequence in the plurality of boot sequences designates a second subset of memory locations accessible in a second secure operating mode;
   authenticating boot code using a first key in the set of cryptographic keys;
   configuring a memory map designating open and secure memory locations in the secure processing system based on the selected boot sequence;
   defining a policy for a secure operating mode based on the selected boot sequence; and
   enforcing the secure operating mode using components within the security boundary, wherein enforcing the secure mode of operation comprises:
      decrypting secure code using a second key in the set of keys,
      storing secure data in memory encrypted with the second key, and
      blocking access to secure peripherals based on the configuration of the secure operating mode.

10. The method of claim 9, further comprising:
    retrieving secure application code by a secure memory access unit within the security boundary;
    decrypting the secure application code using the second key in the set of cryptographic keys; and
    executing the secure application code in a secure processor operating in the secure operating mode.

11. The method of claim 9, wherein each key in the set of cryptographic keys remains within the security boundary during a lifetime of the key.

12. The method of claim 9, wherein the set of cryptographic keys is generated during a manufacture of the secure processing system.

13. The method of claim 9, further comprising registering the secure processing system by loading a copy of at least one key in the set of keys into a secure database.

14. The method of claim 12, further comprising registering the secure processing system during the manufacture of the secure processing system.

15. A secure processing system for enforcing a secure operating mode, comprising:
    means for generating a set of cryptographic keys;
    means for determining, responsive to a reset signal, whether a secure memory has been programmed with key material;
    means for selecting one of a plurality of boot sequences responsive to determining that the secure memory has been programmed with key material, wherein a first boot sequence in the plurality of boot sequences designates a first subset of memory locations accessible in a first secure operating mode, and wherein a second boot sequence in the plurality of boot sequences designates a second subset of memory locations accessible in a second secure operating mode;
means for authenticating boot code using a first key in the set of cryptographic keys, wherein the set of cryptographic keys is generated in a secure peripheral within a security boundary of the secure processing system;
means for configuring a memory map designating open and secure memory locations in the secure processing system based on the selected boot sequence, and
means for defining a policy for the secure operating mode based on the selected boot sequence;
means for enforcing the secure operating mode using components within the security boundary;
means for decrypting secure code using a second key in the set of keys;
means for storing secure data in memory encrypted with the second key;
means for blocking access to secure peripherals based on the configuration of the secure operating mode; and
means for generating a signal enabling access of a master, configured to operate in the selected secure operating mode, to a memory location when the memory location is within a subset of secure memory locations corresponding to the selected secure operating mode.

16. The method of claim 14, further comprising:
retrieving secure application code by a secure memory access unit within the security boundary;
decrypting the secure application code using the second key in the set of cryptographic keys; and
executing the secure application code in a secure mode.

17. The method of claim 14, wherein each key remains within the security boundary.

18. The method of claim 14, wherein the set of cryptographic keys is generated during the manufacture of the secure processing system.

19. The method of claim 14, further comprising registering the secure processing system by loading a copy of at least one key in the set of keys into a secure database.

20. The method of claim 18, further comprising registering the secure processing system during the manufacture of the secure processing system.

21. The method of claim 1, wherein the boot code includes a boot loader function configured to verify a secure boot image using an internally programmed unique key prior to transferring execution to the secure boot image.

22. The method of claim 21, wherein the internally programmed unique key is generated using the secure peripherals and stored in the secure peripherals.

23. The method of claim 1, further comprising transferring execution to externally encrypted and authenticated executable secure code using a secure boot image.

24. The method of claim 1, further comprising switching a vector table of the secure processing system to a new vector table associated with the selected boot sequence responsive to switching the secure processing system to the selected secure operating mode.

25. The method of claim 24, wherein the reset signal is generated based on a reset vector in the vector table.

* * * * *